(12) United States Patent
Aggarwal et al.

(10) Patent No.: US 12,213,103 B2
(45) Date of Patent: *Jan. 28, 2025

(54) DYNAMICALLY ADAPTING PROVISION OF NOTIFICATION OUTPUT TO REDUCE USER DISTRACTION AND/OR MITIGATE USAGE OF COMPUTATIONAL RESOURCES

(71) Applicant: GOOGLE LLC, Mountain View, CA (US)

(72) Inventors: Vikram Aggarwal, Palo Alto, CA (US); Moises Morgenstern Gali, San Francisco, CA (US)

(73) Assignee: GOOGLE LLC, Mountian View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,402

(22) Filed: Nov. 28, 2023

(65) Prior Publication Data
US 2024/0098698 A1  Mar. 21, 2024

Related U.S. Application Data

(63) Continuation of application No. 17/479,135, filed on Sep. 20, 2021, now Pat. No. 11,871,219, which is a
(Continued)

(51) Int. Cl.
*H04W 68/02* (2009.01)
*B60W 40/08* (2012.01)
(Continued)

(52) U.S. Cl.
CPC ............ *H04W 68/02* (2013.01); *B60W 40/08* (2013.01); *G06F 9/546* (2013.01); *H04L 67/535* (2022.05);
(Continued)

(58) Field of Classification Search
CPC .......... G06F 9/546; H04W 4/46; H04W 68/02; H04W 4/029; H04W 4/12; H04L 67/62; H04L 67/535; H04L 67/12; B60W 40/08
See application file for complete search history.

(56) References Cited

U.S. PATENT DOCUMENTS 9,548,050 B2   1/2017  Gruber et al.
9,903,725 B2   2/2018  Sato et al.
(Continued)

FOREIGN PATENT DOCUMENTS

CN   102148888   8/2011
CN   103051803   4/2013
(Continued)

OTHER PUBLICATIONS

China National Intellectual Property Administration; Notification of Second Office Action issued in Application No. 201880039448.0; 27 pages; dated Nov. 8, 2023.
(Continued)

*Primary Examiner* — Congvan Tran
(74) *Attorney, Agent, or Firm* — Gray Ice Higdon

(57) ABSTRACT

Dynamically adapting provision of notification output to reduce distractions and/or to mitigate usage of computational resources. In some implementations, an automated assistant application predicts a level of engagement for a user and determines, based on the predicted level of engagement (and optionally future predicted level(s) of engagement), provisioning (e.g., whether, when, and/or how) of output that is based on a received notification. For example, the automated assistant application can, based on predicted level(s) of engagement, determine whether to provide any output based on a received notification, determine whether to suppress provision of output that is based on the received notification (e.g., until a later time with a decreased predicted level of engagement), determine whether to provide
(Continued)

output that is a condensed version of the received notification, determine whether to automatically respond to the notification, and/or select an output modality for providing output that is based on the received notification.

20 Claims, 7 Drawing Sheets

Related U.S. Application Data continuation of application No. 16/819,326, filed on Mar. 16, 2020, now Pat. No. 11,129,134, which is a continuation of application No. 16/451,447, filed on Jun. 25, 2019, now Pat. No. 10,624,060, which is a continuation of application No. 15/818,310, filed on Nov. 20, 2017, now Pat. No. 10,368,333.

(51) Int. Cl.
  *G06F 9/54* (2006.01)
  *H04L 67/50* (2022.01)
  *H04W 4/029* (2018.01)
  *H04W 4/12* (2009.01)
  *H04W 4/46* (2018.01)

(52) U.S. Cl.
  CPC ............ *H04W 4/029* (2018.02); *H04W 4/12* (2013.01); *H04W 4/46* (2018.02)

(56) References Cited

U.S. PATENT DOCUMENTS

| | | | |
|---|---|---|---|
| 10,368,333 | B2 | 7/2019 | Aggarwal |
| 10,624,060 | B2 | 4/2020 | Aggarwal |
| 11,009,873 | B2 | 5/2021 | Ueno |
| 11,129,134 | B2 | 9/2021 | Aggarwal |
| 2002/0177928 | A1 | 11/2002 | Moriguchi et al. |
| 2005/0021227 | A1 | 1/2005 | Matsumoto et al. |
| 2005/0071078 | A1 | 3/2005 | Yamada et al. |
| 2008/0021632 | A1 | 1/2008 | Amano |
| 2010/0082246 | A1 | 4/2010 | Crane |
| 2011/0040579 | A1* | 2/2011 | Havens ............... G06Q 10/08 705/4 |
| 2011/0210865 | A1 | 9/2011 | Lee et al. |
| 2012/0322473 | A1 | 12/2012 | Cazanas et al. |
| 2013/0173147 | A1* | 7/2013 | Takeuchi .......... G01C 21/3469 701/123 |
| 2013/0332172 | A1 | 12/2013 | Prakash et al. |
| 2014/0022121 | A1 | 1/2014 | Donovan et al. |
| 2014/0280051 | A1 | 9/2014 | Djugash |
| 2014/0303842 | A1 | 10/2014 | Boelter et al. |
| 2014/0310075 | A1 | 10/2014 | Ricci |
| 2015/0292893 | A1 | 10/2015 | Bartsch et al. |
| 2016/0311323 | A1 | 10/2016 | Lee |
| 2016/0349075 | A1 | 12/2016 | Son |
| 2017/0028995 | A1 | 2/2017 | Mori |
| 2017/0368936 | A1 | 12/2017 | Kojima |
| 2018/0063282 | A1 | 3/2018 | Crowe et al. |
| 2018/0105186 | A1 | 4/2018 | Motomura |
| 2022/0007331 | A1 | 1/2022 | Aggarwal et al. |

FOREIGN PATENT DOCUMENTS

| | | |
|---|---|---|
| CN | 105144133 | 12/2015 |
| CN | 106716468 | 5/2017 |
| CN | 104584096 | 9/2017 |
| EP | 2814229 | 12/2014 |
| EP | 3038047 | 6/2016 |
| JP | 2001141475 | 5/2001 |
| JP | 2003348193 | 12/2003 |
| JP | 2004251790 | 9/2004 |
| JP | 2005001533 | 1/2005 |
| JP | 2007051932 | 3/2007 |
| JP | 2008299528 | 12/2008 |
| JP | 2009134525 | 6/2009 |
| JP | 2009253807 | 10/2009 |
| JP | 2011039629 | 2/2011 |
| JP | 2011229097 | 11/2011 |
| JP | 2015092311 | 5/2015 |
| JP | 2015169472 | 9/2015 |
| JP | 2016001984 | 1/2016 |
| JP | 2016012292 | 1/2016 |
| JP | 2016119080 | 6/2016 |
| JP | 2016208124 | 12/2016 |
| JP | 2017030555 | 2/2017 |
| JP | 2017138741 | 8/2017 |
| WO | 2013029258 | 3/2013 |
| WO | 2017085981 | 5/2017 |
| WO | 2016001984 | 6/2017 |

OTHER PUBLICATIONS

Korean Patent Office; Office Action issued in Application No. KR10-2023-7006146; 10 pages; dated Sep. 25, 2023.
Intellectual Property India; Hearing Notice issued in Application No. 201927050989; 3 pages; dated Aug. 16, 2023.
Japan Patent Office; Notice of Reasons for Rejection issued for Application No. 2022-072349, 7 pages, dated Apr. 24, 2023.
China National Intellectual Property Administration; Notification of First Office Action issued in Application No. 201880039448.0; 6 pages; dated Feb. 21, 2023.
Korean Patent Office; Notice of Allowance issued in Application No. KR10-2022-7002793; 5 pages; dated Nov. 28, 2022.
European Patent Office; Communication pursuant to Article 94(3) issued in Application No. 18839953.9, 8 pages, dated Sep. 5, 2022.
Japanese Patent Office; Notice of Allowance issued in Application No. 2019-568360, 9 pages, dated Mar. 28, 2022.
Korean Patent Office; Office Action issued in Application No. KR10-2022-7002793; 11 pages; dated Apr. 26, 2022.
Korean Patent Office; Office Action issued in Application No. 1020197038223; 33 pages; dated Feb. 21, 2021.
Korean Patent Office; Notice of Allowance issued in Application No. 1020197038223; 5 pages; dated Oct. 29, 2021.
Japanese Patent Office; Office Action issued in Application No. 2019-568360; 10 pages; dated Sep. 13, 2021.
Japanese Patent Office; Office Action issued in Application No. 2019-568360; 14 pages; dated Mar. 8, 2021.
Intellectual Property India; Office Action issued in Application No. 201927050989; 6 pages; dated Mar. 22, 2021.
"Samsung Creates In-Traffic Reply App to Prevent Distracted Driving." Samsung Global Newsroom. https://news.samsung.com/global/samsung-creates-in-traffic-reply-app-to-prevent-distracted-driving. 2 pages; Apr. 26, 2017.
European Patent Office; Invitation to Pay Additional Fees and, Where Applicable, Protest Fee of Ser. No. PCT/US2018/061312; 15 pages; dated May 2, 2019.
European Patent Office; International Search Report and Written Opinion of Ser. No. PCT/US2018/061312; 20 pages; dated Jul. 4, 2019.
Japanese Patent Office; Notice of Refusal issued in Application No. 2023-207559; 4 pages; dated Nov. 11, 2024.

* cited by examiner

DYNAMICALLY ADAPTING PROVISION OF NOTIFICATION OUTPUT TO REDUCE USER DISTRACTION AND/OR MITIGATE USAGE OF COMPUTATIONAL RESOURCES

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using (i) spoken natural language input (i.e. utterances), which may in some cases be converted into text and then processed, and/or (ii) by providing textual (e.g., typed) natural language input. Typically, in order for an automated assistant application to generate a desired response on behalf of a user, the user and the automated assistant application must correspond over multiple interactions. For instance, a user can provide, to an automated assistant application, a spoken input that describes content of a responsive message to be transmitted by the automated assistant application to a contact. Prior to transmitting the responsive message, the automated assistant may reiterate the received input from the user to ensure the accuracy of the received input. When such interactions take place while the user is engaged in an activity, such as driving a vehicle, the user can become distracted, thereby creating a dangerous situation for the user. Additionally, requiring an automated assistant application to undertake multiple interactions with a user in order to accomplish a task can waste computational resources at a computing device that hosts the automated assistant application, waste computational resources at other device(s) that supports the functionality of the automated assistant application, and/or waste network resources (e.g., at a client device(s) and/or a network device(s)) consumed in transmission of data (e.g., audio data) related to the multiple interactions.

Some automated assistants can additionally and/or alternatively provide various notifications to a user, and typically provide such notifications upon receipt. The notifications can include, for example, notifications from a device that is separate from a device executing an automated assistant application, notifications from applications that are separate from the automated assistant, and/or notifications from an operating system of the device executing the automated assistant application. However, a user may ignore the notifications, not comprehend the notifications, and/or otherwise not address the notifications, at least at the time of receipt. As a result, the user may need to interact with the automated assistant (and/or other applications) at a later time in order to address any previously presented notifications that were not addressed by the user at the time of receipt. This can lead to computational resource and/or network inefficiencies, as the notifications are ignored upon initial provision, and must be provided again following the initial provision.

SUMMARY

Implementations of the present disclosure are generally directed to methods, apparatus, and computer-readable media (transitory and non-transitory) related to an automated assistant application that dynamically determines whether, when, and/or how to present various notifications to a user. The dynamic adaptation of whether, when, and/or how to present various notifications can reduce distraction, thereby increasing user safety—and/or can result in a reduction in quantities and/or extents of provided notifications, thereby reducing consumption of various computational resources utilized in the provision of notifications. In some implementations, an automated assistant application can determine whether to: (i) fully present a notification, such as a text message, (ii) provide a condensed version of content of the notification, (iii) suppress the presentation of the notification (or condensed version thereof) until the user is less distracted, (iv) automatically respond to the notification (optionally with delayed provision of any aspect of the notification, or without provision of any aspect of the notification), or (v) fully suppress the notification. Additionally or alternatively, the automated assistant application can select an output modality (e.g., sound, image, video, vibration, and/or any other medium) via which to provide a notification (or condensed version thereof). In some of those implementations, whether, when, and/or how to present a notification can be based on one or more of: a predicted current level of engagement of the user, a predicted future level of engagement of the user, one or more properties of the notification (e.g., content of the notification, a "type" of the notification, a source of the notification), and/or a time that the notification is received. In some versions of those implementations, the predicted current level of engagement of the user can be based on various sensor data (e.g., from one or more vehicle sensors of a vehicle of the user and/or from one or more client devices of the user), a route that is being navigated by a vehicle in which the user is an occupant (e.g., when the user is the driver), application data, and/or other data.

In implementations set forth herein, an automated assistant can determine when and/or how the user would most likely comprehend and/or address certain notifications, and provide notifications based on such determination(s). By providing notifications in such manners, computational resources can be preserved by mitigating the occurrences of notifications being provided to a user at a time when the user is distracted and would not comprehend and/or address the notifications. Accordingly, providing notifications in such manners decreases a quantity of occurrences of recalling of unaddressed and/or non-comprehended notifications at a later time, thereby conserving computational resources that would otherwise be utilized in again providing the notifications at the later time. Additionally or alternatively, by adapting a format, timing, and/or any other property of the presentation of a notification, potentially dangerous and/or distracting situations affecting the user and/or other persons can be avoided. Furthermore, adapting notifications in such ways can improve the quality of notifications. For instance, when presentation of a notification is delayed until a user is idle or not traveling, less resources can be spent collecting contextual data, thereby allowing more resources to be used in the presentation of the notification, as well as to effectuate a faster response to the notification.

As one example of implementations described herein, assume a user is driving a vehicle and that a text message is received at a given time by a computing device of the user when the user is driving. An automated assistant application (associated with the computing device and/or an additional computing device paired with the computing device) can determine whether, when, and/or how to provide, for presentation to the user, content that is based on the text message. The determination can be based on current and/or future predicted levels(s) of engagement for the user and/or based on content of the text message. For example, if data indicates that, at the given time, the user is highly engaged and/or will be highly engaged in the near-term, the automated assistant application can suppress the immediate and/or near-term provision of any output of content that is based on the text message. For instance, the automated assistant application can suppress the immediate provision of any output of content that is based on the text message and can instead output content that is based on the text message at a later time, based on data indicating that, at the later time, the user is less engaged.

The content provided at the later time can include, for example, the entirety of the text message or a condensed version of the text message. Whether the entirety of the text message or the condensed version of the text message is provided can be based on a predicted level of engagement at the later time. For example, the condensed version can be provided if the predicted level of engagement at the later time indicates a "medium" level of engagement, whereas the entirety can be provided if the predicted level of engagement at the later time indicates a "low" level of engagement. The content provided at the later time can additionally or alternatively include, for example, a prompt to confirm that the automated assistant application can respond to the text message on behalf of the user, or a confirmation that the automated assistant application responded to the text message on behalf of the user. For example, the automated assistant application could have automatically responded to the text message while the user was highly engaged (and without first prompting the user), and can provide a summary of the provided response at the later time based on determining the user is less engaged at the later time. By condensing messages, network resources can be preserved, as less data would be required to transmit a condensed message rather than a full version of the message.

As another example of implementations described herein, assume a user is driving a vehicle and that a text message and a sports score notification are both received at or near a given time by a computing device of the user when the user is driving. Further assume that an automated assistant application (associated with the computing device and/or an additional computing device paired with the computing device) determines, based on data, a "medium" predicted level of engagement for the user at the given time. For the sports score notification, the automated assistant application can determine to suppress the immediate provision of any output that is based on that notification and instead wait and provide such output until a time with a "low" predicted level of engagement—or even wait until driving is concluded. Such determinations can be based on the "medium" level of engagement and/or one or more properties of the sports score notification (e.g., based on it being of a "sports score type", being from a particular application, based on prior interaction(s) of the user with prior sports score notifications). For the text message, the automated assistant can determine, based on the "medium" level of engagement and optionally based on one or more properties of the text message (e.g., sender, content), to immediately provide a condensed version of the text message through an audible output modality, but to not immediately provide any of the message through a graphical output modality.

As a variation, assume that the same text message and sports score notification are received, but that at the given time a "low" predicted level of engagement for the user is predicted. In such a situation, the sports score notification can be immediately provided. Also, the condensed version of the text message can be immediately provided through an audible output modality, and all or portions of the message can also be immediately provided through a graphical output modality.

As yet another variation, assume that the same text message and sports score notification are received, but that at the given time a "high" predicted level of engagement for the user is predicted. In such a situation, the automated assistant can suppress the immediate provision of any output based on the sports score notification and can suppress the immediate provision of any output based on the text message. For the sports score notification, the automated assistant can wait and provide output based on the notification until occurrence of a "low" predicted level of engagement. For the text message, the automated assistant can instead wait and provide output based on the notification until occurrence of either a "medium" or "low" predicted level of engagement (i.e., whichever occurs first). Optionally, how the output based on the text message is provided can vary dependent on whether the occurrence is an occurrence of a "medium" or a "low" predicted level of engagement. For example, the entirety of the text message can be audibly and graphically provided if the predicted level of engagement is "low", whereas a condensed version of the text message can be only audibly provided if the predicted level of engagement is "medium".

As described above and elsewhere herein, whether, when, and/or how to provide output that is based on a notification can be based on current and/or future predicted levels(s) of engagement for the user. A predicted level of engagement of a user can be based on various data, such as data generated by one or more sensors of a vehicle, data related to a route being navigated by a user, data generated by sensors that measure physical characteristics of the user (e.g., heart rate as determined from a sensor of a wearable electronic watch), and/or other data. For example, a predicted level of engagement can be based on characteristics of audio captured by microphone(s) of computing device(s) of and/or in the vehicle. For instance, if captured audio is indicative of screaming/crying kids, a higher level of engagement can be predicted than if the captured audio is indicative of relatively quiet conditions. As another example, a predicted level of engagement can additionally or alternatively be based on a speed of the vehicle as measured by one or more sensors, an amount of recent braking as measured by one or more sensors, and amount and/or extent of recent acceleration/deceleration as measured by one or more sensors, etc. For instance, if sensor data indicates the vehicle is currently stopped, a lower level of engagement can be predicted than if the sensor data indicates the vehicle is currently moving and that multiple significant accelerations/decelerations have recently occurred. As yet another example, a predicted level of engagement can additionally or alternatively be based on current or upcoming traffic conditions, current or upcoming predicted pedestrian activity, etc. (e.g., as obtained from map data). As yet another example, a predicted level of engagement can additionally or alternatively be based on predicted upcoming portions of a route based on a destination of the user. A destination of the user can be based on, for example, the user utilizing user interface input at a client device to provide the destination to a navigation application that is providing route guidance to the user and/or the destination can be inferred without explicit input from the user. For instance, a stored "work location" for the user can be inferred based on temporal considerations (e.g., in the morning and/or on a weekday), past trips of the user to the "work location" (e.g., typically occur in the morning and/or on weekdays), and/or already navigated portions of a route (e.g., the thus far navigated route is heading toward the "work location"). Also, for instance, a location for the user can be inferred based on a calendar entry of the user (e.g., based on a location in the calendar entry, and the user driving near the time of the calendar entry), and/or based on other data of the user.

As also described above and elsewhere herein, whether, when, and/or how to provide output that is based on a notification can additionally or alternatively be based one or more properties of the notification. Such properties can be based on content of the notification, a source of the notification (e.g., which app initiated the notification or which other user initiated the notification), a type of the notification (e.g., a message vs. an app notification, or more granular types), past interactions of a user with similar notifications, etc.

Although examples of various implementations are provided above, such examples are not meant to be limiting. Additional detail on those various implementations, as well as additional implementations, are provided below.

In some implementations, a method implemented by one or more processors is set forth as including operations such as receiving, at an automated assistant application, an electronic message that is directed to a user that is on an excursion to a destination via a vehicle that includes a computing device. The automated assistant application can be executing on the computing device or in communication with the computing device. Furthermore, the message can be received during or before a first portion of a route of the excursion. The operations can further include determining a first predicted level of engagement for the user during the first portion of the route, determining a second predicted level of engagement for a second portion of the route that is subsequent to the first portion of the route, and determining that the second predicted level of engagement indicates less engagement than the first predicted level of engagement.

The operations can further include, based on determining that the second predicted level of engagement indicates less engagement than the first predicted level of engagement: determining to withhold output, of any content that is based on the message, while the vehicle is navigating the first portion of the route, and causing the computing device of the vehicle to output, to the user while the vehicle is navigating the second portion of the route, content that is based on the message. In some implementations, the method can include determining, based on the message, that the message corresponds to a category of messages that elicit explicit verbal content from the user subsequent to receiving the message. Causing the computing device of the vehicle to output, to the user while the vehicle is navigating the second portion of the route, the content that is based on the message can be further based on: identifying a correspondence between the second predicted level of engagement and the category of messages that elicit explicit verbal content from the user. Determining that the message corresponds to the category of messages that elicit explicit verbal content from the user can be further based on historical interaction data associated with one or more previous interactions between the user and the automated assistant application. Determining the first predicted level of engagement and the second predicted level of engagement is based on mute intricacy data for the route. Determining the route intricacy data can include receiving map application data from a map application that is accessible to the computing device. Determining the first predicted level of engagement for the first portion of the route can include determining, based on the map application data, an amount of time between at least two maneuvers for navigating the vehicle during the first portion of the route. The method can further include determining, based on the second predicted level of engagement, an output modality for providing the content that is based on the message. Causing the computing device of the vehicle to output the content that is based on the message while the vehicle is navigating the second portion of the route can include causing the computing device to output the content using the selected output modality. Determining the output modality for providing the content that is based on the message can be further based on one or more properties of the message. The method can also include operations of determining, based on the second predicted level of engagement, a type of message content to provide, and causing the computing device to output the content of the message, based on the content of the message conforming to the type.

In other embodiments, a method implemented by one or more processors is set forth as including operations such as receiving a route to be navigated by a user via a vehicle that includes a computing device, and generating, for each of a plurality of portions of the route, a predicted level of operational engagement of the user. Each of the predicted levels of operational engagement can quantify a predicted amount of attention that the user will exert to navigate the vehicle during a corresponding one of the portions of the route. The operations can further include receiving an electronic notification generated by a third-party application, and generating a predicted level of application engagement for the electronic notification. The predicted level of application engagement can quantify a predicted amount of cognition that the user will exert when consuming or acknowledging the electronic notification or responding to the electronic notification. The operations can also include correlating the electronic notification to a given route portion, of the portions of the route, based on comparison of the predicted levels of operational engagement to the predicted level of application engagement. Furthermore, the operations can further include, based on correlating the electronic notification to the given route portion, causing the computing device of the vehicle to provide output that is based on the electronic notification when the vehicle is traversing the given route portion. Generating the predicted level of operational engagement for the given route portion can include identifying a category for one or more vehicle maneuvers for navigating the given route portion. Generating the predicted level of operational engagement for the given route portion can include identifying a category for one or more application inputs or application outputs associated with the electronic notification. The method can further include determining, based on the predicted level of operational engagement for the given route portion, an output modality for providing the output that is based on the electronic notification. Causing the computing device to provide the output that can be based on the electronic notification comprises causing the computing device to output the content using the selected output modality. Determining the output modality can be further based on one or more properties of the electronic notification. The method can also include determining, based on the predicted level of operational engagement for the given route portion, whether to cause the computing device to provide, as the output: an entirety of the electronic notification, a compressed version of the electronic notification, or a confirmation that the electronic notification was responded to on behalf of the user.

In yet other implementations, a method implemented by one or more processors is set forth as including operations such as receiving, at automated assistant application, a message that includes content associated with an excursion in which a user is participating. The user can participate in the excursion using a vehicle that includes a computing device that is accessible to the automated assistant application. The operations can further include identifying, from the message, one or more queries associated with the excursion or the vehicle. The one or more queries are directed to the user from a separate computing device that is operated by a separate user. The operations can further include accessing data available to the computing device, the data associated with the vehicle or the excursion of the user, and determining, based on the data and content of the one or more queries, that the data identifies information that is acceptable for answering the one or more queries without explicit user interface input generated by the user in response to the message. The operations can further include generating a responsive message to the one or more queries that is based on the data and devoid of the explicit user interface input from the user, and causing the responsive message to be transmitted to the separate computing device.

The data can be generated by a route mapping application that includes location data identifying a destination for the excursion. The one or more queries can elicit the user to provide the destination for the excursion. Identifying one or more queries associated with the excursion or the vehicle can include identifying a category associated with the one or more queries identified from the message, and determining whether the category corresponds to travel related data accessible to the automated assistant application. Accessing the data can be performed in response to determining that the category corresponds to the travel related data. The method can further include causing the computing device to provide an inquiry to the user. The inquiry can request permission, from the user, regarding whether the automated assistant application is permitted to respond with the responsive message without the user explicitly reciting content to be included in the responsive message. Identifying the one or more queries associated with the excursion can include parsing the message to distinguish content that is separate from the one or more queries associated with the excursion. The data can identify a first location of the vehicle, the message can identify a second location of the separate computing device, and generating the responsive message can include comparing the first location of the vehicle to the second location of the separate computing device.

In some implementations, a method implemented by one or more processors is set forth as including operations such as receiving an electronic notification during navigation, by a user, of a vehicle that includes a computing device, and generating a predicted level of operational engagement of the user. The predicted level of operational engagement can quantify a predicted amount of attention that the user is exerting in navigating the vehicle. The operations can also include determining, based on the predicted level of operational engagement of the user, at least one property for provision of content corresponding to the electronic notification. The at least one property can identify one or more of: when the content is provided for presentation to the user, and a presentation format of the content. The operations can further include causing the computing device of the vehicle to provide the content in conformance with the at least one property. Determining the at least one property can be further based on at least one characteristic of the electronic notification. The operations can further include determining, based on at least one characteristic of the electronic notification, whether to provide the content corresponding to the electronic notification during the navigation of the vehicle or to suppress provision of the content until the navigation of the vehicle has ceased. Causing the computing device to provide the content in conformance with the at least one property can be based on determining to provide the content during the navigation of the vehicle. The presentation format can include a condensed presentation format. The presentation format can include a summary of an action to be taken by, or already taken by, an automated assistant on behalf of the user.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
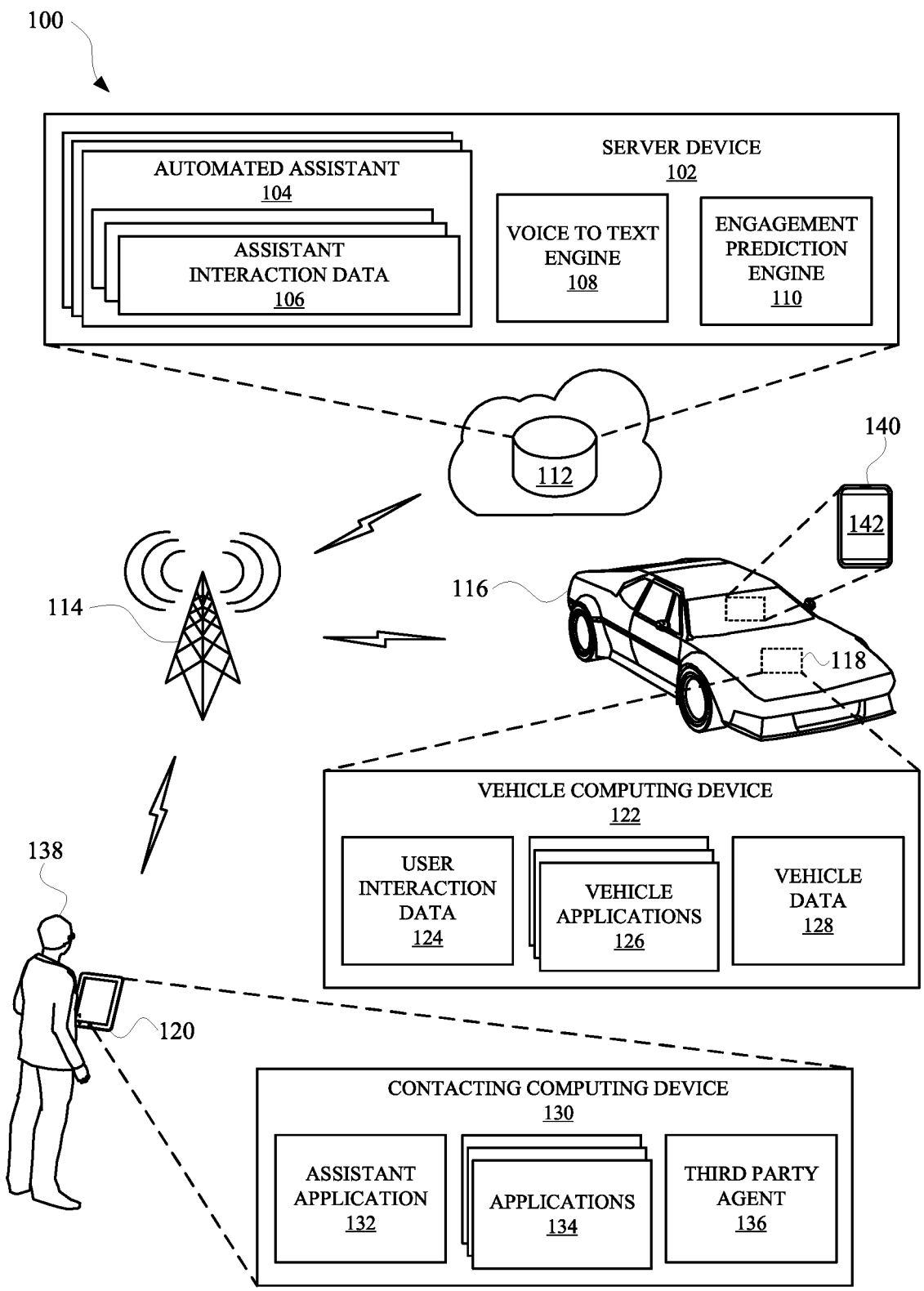
FIG. 1 provides a diagram that illustrates an automated assistant that is capable of adapting or customizing the sending and/or receiving of messages or notifications to a user.

Typical automated assistant applications can require extensive back and forth between the automated assistant applications and a user before the automated assistant applications are able to perform some operation to benefit the user. For example, when a person wants to send a text to someone, they will have to specify the person, the number to use (e.g., such as a work number or a home number), and describe the message content that is to be embodied in the message to be sent. Oftentimes, messages sent while driving can be about a route, and/or include information about a destination, an event, a time of arrival, people in the vehicle, and/or any other descriptors that can be related to an excursion of the user.

As used herein, notifications include various messages that are directed to a user and that are initiated by another user sending the messages via a corresponding client device. Such messages include SMS messages, text messages, emails, third party messaging application messages, etc. Notifications further include notifications that are not messages initiated by another user via a corresponding computing device. For example, notifications can also include notifications generated by applications installed on a computing device of a user (e.g., a notification that is a score update by a sports app, a notification that is a sale notification from a shopping app), system notifications generated by an operating system of a computing device of a user (e.g., a notification that a battery level is running low, a notification that a Wi-Fi network is available), etc.

In some implementations, an automated assistant application can operate on or at an automobile computing device and/or a personal computing device that is located within, but separate from, the automobile. In some of those implementations, the automated assistant application can operate on or at the automobile computing device, rather than a personal computing device such as a cell phone. However, the personal computing device can be paired with the automobile computing device, thereby providing a medium through which the automated assistant application can access data received at the personal computing device. Furthermore, because the automated assistant application can be executing on the automobile computing device and/or on a personal computing device that is paired with the automobile computing device, the automated assistant application can access vehicle related data. In order to prevent from distracting while driving or performing some other activity, the automated assistant can modify a provision (i.e., specifications of whether, when, and/or how something is presented) of a notification or message using data associated with the activity, the notification, and/or the user.

In some implementations, a message can be received by a third-party device (e.g., a tablet computing device made by a third party manufacturer) that is paired with an assistant application interface of the automobile computing device, and the assistant application interface can be in communication with an automated assistant application. The automated assistant application can be hosted at a remote device, such as a server device, or at a computing device that is located within, or otherwise attached to, the vehicle. The automated assistant application can process the message to determine whether the message includes one or more queries that can be responded to using data that is (i) accessible to the automated assistant application, or (ii) otherwise related to an excursion of the vehicle. Processing an incoming message can include classifying a message according to whether the message is capable of being responded to with less than a threshold number of interactions with, and/or inputs from, the user. In some implementations, queries that can be responded to based on data related to an excursion of the vehicle can include requests for an estimated time of arrival and/or a request for a current location of the user or the vehicle. Messages that include queries that may not be direct questions regarding a person's location or time of arrival can also be responded to, for example, when a sender is simply telling a person where they are at, whether they have arrived at the destination, and/or whether an event has started.

Data that can be collected during an excursion of a vehicle can include a velocity of the vehicle, location(s) of the vehicle, features of an environment of the vehicle such as weather, where the user is navigating to, an estimated time of arrival for the user, and/or any the other information that can be collected by a sensor and/or other device during an excursion of a vehicle. As described herein, such data can be utilized in determining whether, when, and/or how messages and/or other incoming notifications are presented to a user. Further, such data can additionally or alternatively be utilized in determining content for utilization in responding to an incoming message on behalf of a user. For example, for an incoming message of "Where are you?," instead of a user having to type out or vocally describe their location to an automobile computing device, the user can simply confirm that the automated assistant application send the location of the user to a sender of the message. The confirmation permitting the automated assistant application to respond on behalf of the user can be provided before, during, and/or after the receipt of a notification. For example, the user can advise the automated assistant application to reply, without notification, on behalf of the user when a spouse of the user inquires about the location of the user via text message (e.g., "When my wife asks where I'm at, please send my location to her without notifying me while I'm driving."). As a result, when the message "Where are you?" is received from the spouse while the user is driving, the automated assistant application will reply with geolocation data associated with the user, and not notify the user of the message or the reply.

Alternatively, while receiving a notification, the user can set a preference to receive particular notifications when they have completed an activity (e.g., finished driving, leaving their office, leaving the grocery, etc.). For instance, the automated assistant application can notify the user that they are receiving a call from an acquaintance. When receiving the notification or the call, the user can provide a verbal command such as, "Please notify me of calls and missed calls from Adam when I am done driving." In response, the automated assistant application can modify settings for presenting notifications related to calls and missed calls from a contact "Adam." The settings can cause the automated assistant application to delay the transmission or notification of calls from Adam until a user has completed their drive. As described herein, the automated assistant application can additionally and/or alternatively automatically determine when to provide a notification to a user, without having previously received any explicit indication of a preference from the user related to when to provide the notification. For example, the automated assistant application can automatically determine when to provide a notification based on predicted level(s) of engagement of a user and/or properties of the notification, as described herein.

In some implementations, the user can change a modality through which a notification is presented, thereby allowing the user to still receive notifications but, perhaps, in a form that is less distracting or requires less cognitive resources (e.g., less short term memory). For example, the user can be operating a vehicle that includes a graphical user interface (GUI) that is connected to the vehicle computing device. The automated assistant application can present emails associated with a work email account at the GUI while the user is driving. In response to receiving a notification regarding a work-related email, the user can provide a spoken command such as, "When I'm driving and I receive a work email, please just read me the subject line." In response, the automated assistant application can change the modality through which the user receives work email notifications while driving. Thereafter, instead of a notification regarding a work email being presented at the GUI of the vehicle computing device, the automated assistant application can cause an audio device (e.g. a speaker) of the vehicle to output spoken language corresponding to the subject line of the work email. Alternatively, the user can set preferences for delaying of notifications until a particular time and/or a particular condition or context has occurred. For instance, referencing the aforementioned example, the user can provide a spoken command such as, "When I'm driving and I receive a work email, please just read me the subject line when I'm done driving." Thereafter, when the user receives a work email while driving, the automated assistant application can read the subject line of the work email to the user through a device that is being accessed by, or is otherwise in an audible range of, the user.

The user could also provide the spoken command such as, "When I'm driving home from work and I receive a work email, please just read me the sender's name when I get home." Thereafter, when the user is driving home and receives a work email, the automated assistant application can delay providing a notification to the user until geolocation data associated with the user indicates that the user is at home. At that point, the automated assistant application can cause an audio device in the home of the user to provide an audible output to the user indicating that the user received a work email from a particular sender. In this way, the automated assistant, through input of the user, has reduced a number of potential distractions while driving, while also changing a modality through which notifications are received. As described herein, the automated assistant application can additionally and/or alternatively automatically determine a modality to provide a notification to a user, without having previously received any explicit indication of a preference from the user related to a modality. For example, the automated assistant application can automatically determine a modality for providing a notification based on predicted level(s) of engagement of a user and/or properties of the notification, as described herein.

In some implementations, a user can receive a message from a sender and the automated assistant application can respond to the message without necessarily reading or describing the message to the user. For example, the automated assistant application can process an incoming message to determine whether the automated assistant application can respond to one or more queries identified in the message. If the automated assistant application can respond to at least one of the queries, the automated assistant application can generate a notification for the user indicating that (i) a message was received and/or (ii) that the automated assistant application can respond to the message.

The automated assistant application can provide a notification such as, for instance, "I received a message from Adam Smith, and I can respond to it with your location. Would you like me to respond with your location?" If the user responds positively to the notification from the automated assistant application ("Yes, please respond to the message."), the automated assistant application can generate a responsive message and cause the responsive message to be transmitted to a device associated with the sender (e.g., Adam Smith). In this way, the user does not necessarily have to listen to the message while driving, nor does the user have to necessarily describe what the content of the responsive message should include. This allows the user to focus more on other tasks such as driving, communicating with persons in their vehicle, listening to audio in the vehicle, and/or any other activities that can be performed safely while operating the vehicle. Moreover, computational resources can be preserved at the devices operating within the vehicle and/or remote devices that typically handle the sending and receiving of messages. Responsive messages can be generated ahead of the user responding to a notification, in order to further preserve computational resources. In this way, as soon as a user provides permission for the automated assistant application to respond on behalf of the user, any delay in sending the responsive message can be mitigated.

Furthermore, less speech processing would be needed as a result of the automated assistant application interpreting the incoming message and generating a response to one or more queries identified in the incoming message. The only speech processing that may need to be performed would be for example, of the user confirming that they would like the automated assistant application to respond to the message, which can be as simple as a one word response such as "Yes." As described herein, the automated assistant application can determine when to respond to a notification on behalf of a user based on predicted level(s) of engagement of a user and/or properties of the notification. Moreover, the automated assistant application can determine, based on such considerations, whether to first prompt the user prior to responding (e.g., require user confirmation), to respond without first prompting the user, and/or whether and/or when to provide an indication that the automated assistant has responded on behalf of the user.

The data that is collected during an excursion and that can be used when responding to messages can include, for example, global positioning system (GPS) data. The GPS data can be used to identify a course of the user and/or a current location for the user. Each of the identified course and the current location can be embodied in messages that the automated assistant application generates to automatically respond to received messages. Location data that is based on cellular data, such as cell tower triangulation, can also be used as a basis for responding to incoming messages. The cellular data can be used in combination with the GPS data to provide responsive data that is automatically generated by the automated assistant application when a message is received.

In some implementations, map application data can also be used by the automated assistant application. Map application data can include, for example, an intended destination of the user, historical destinations of the user, a start time for a journey of the user, an estimated arrival time of the user, nearby locations of the user, stops that the user will be making along the journey, and/or any other data that can be accessible to a map application. In some implementations, velocity and/or traffic information can be used by the automated assistant application to generate responses to messages that are received while in route to a location. For example, a user can be sent a message that requests the user to call back the sender. However, if the user receives the message while traveling at a certain velocity and/or at a particular point in their route that is somewhat complicated (e.g., includes heavy traffic or complicated maneuvers), the automated assistant application can modify a provisioning of a notification that would otherwise be used to notify the user of a message. For instance, the automated assistant application can omit providing a notification to the user regarding the message and generate a responsive message for the sender indicating that the user is temporarily unavailable to make a call because of a particular aspect of their journey (e.g., their velocity or a difficult turn on their current route). In other words, the automated assistant application can determine that the user is at a portion of a route associated with a high predicted level of engagement. When the automated assistant application receives the message while the user is navigating the portion of the route, the automated assistant application can identify another time or location where the user would be less distracted, and therefore be more capable of receiving the message.

In some implementations, data related to the performance of the vehicle or operational data corresponding to one or more subsystems (e.g., brakes, power steering, charge controller, alternator, temperature sensor, tire pressure sensors, gas tank sensor, etc.) of the vehicle can be used as a basis for the automated assistant application to dynamically determine a provisioning of one or more notifications for a user. For example, data provided by a sensor that measures gas tank level, charge level, engine maintenance, location of the vehicle relative to a side of the mad, and/or any other data that can be indicative of a status of the vehicle can be used as a basis for determining a provisioning of one or more notifications for a user. In some implementations, the automated assistant application can receive a message from a sender and the automated assistant application can provide the user with options for using the operational data of the vehicle to receive and/or respond to the message from the sender.

For instance, when a sender provides a message to the user asking a location of the user, and the operational data of the vehicle indicates that the user is low on gas, the automated assistant application can generate a message that indicates the user is low on gas. The content of the message can include, for example, "I'm on Muhammad Ali Boulevard, but I need to stop for gas." Alternatively, the operational data of the vehicle can indicate that the user is stopped at the side of the road and requires engine maintenance. Therefore, responsive message content generated by the automated assistant application for a responsive message can describe the status of the user based on the operational data. For example, when the user receives a message from a sender asking a status of the user or a location of the user, responsive message content generated by the assistant application can include "I am stopped at the side of the road because of an engine maintenance issue."

In some implementations, the automated assistant application can process data related to the route of the user to determine whether the user is able to accomplish a task that has been identified in a message sent to the user. For example, if the user is traveling at 60 miles an hour and does not have to make a turn for another 15 minutes, the user may be able to conduct a phone conversation while traveling. Therefore, if the user is sent a message that includes a request for the user to call the sender back (e.g., "Hey Luke, can you call me real quick?"), the automated assistant application can recite the message to the user and/or summarize the message and ask the user whether they would like to call the sender. Optionally, the automated assistant application can remind the user of how much time they have before their next turn in order to provide context for their decision of whether to initiate a phone call and/or respond to the message. If the automated assistant application determines that the user is too distracted to conduct a phone conversation (e.g., the user is traveling at 75 miles per hour and has to make two turns in the next 3 minutes), the automated assistant application can wait until the user has less distractions before notifying the user of the message from the sender. For instance, the automated assistant application can wait until the user has completed the route, or at least some portion of the route that requires heightened attention (e.g., maneuvering through the two turns in the next 3 minutes).

In some implementations, the automated assistant application can generate messages that can correct assumptions and/or discrepancies made by a sender of a message. For example, a person can send the user a message asking when they will arrive at a first location such as a movie theater. However, the user may be driving to a second location, such as restaurant, at least according to a map application that the user has employed in order to be routed to the second location. In response to receiving the message, the automated assistant application can process the message to determine that the person is requesting a response from the user that is related to the user's current route. Additionally, the automated assistant application can compare content of the received message with data associated with the route of the user. For example, the data associated with the route of the user can include a destination that has been set by the user in a map application. When the content of the message does not correspond to the data from the map application, the assistant application can generate a message advising the person that the user is navigating to the second location (e.g., the restaurant) and not the first location (e.g., the movie theater). The automated assistant application can then ask the user permission to respond to the person with a corrective response ("Adam is asking when you will arrive at the movie theater. Would you like me to tell him you are going to the restaurant?"). If the user gives the automated assistant application permission to provide the corrective message, the automated assistant application can send the corrective message to the person. The corrective message can be sent without requesting the user to provide further content for the message or to specifically provide the exact text that will be provided in the corrective message. The corrective message can be, for example, "I am going to the restaurant."

In some implementations, because sensor data is typically language-agnostic, automatic replies generated by the automated assistant application can be translated according to a language preference of the sender and/or the user. For example, a sender of a message may have a preference for speaking in French, and the sender may send the user a message, in French, requesting a location of the user. In response, if the user permits the automated assistant application to reply to the sender, the automated assistant can generate content for the message in a language that the user is not familiar with (or is preferred by the sender) but is otherwise based on sensor data associated with the vehicle in which the user is traveling.

In some implementations, the automated assistant application can generate content in response to incoming signals or notifications from other applications that are different than messaging applications. For example, a third party agent or third-party application related to an automotive dealer or an automotive maintenance company may send a notification or message that includes a query asking about a certain aspect of a vehicle owned by a user (e.g., "Is your car still running hot?"). The content of the notification from the third party agent can be processed by the automated assistant application to determine whether the notification is vehicle-related. If the content of the notification is vehicle-related, the automated assistant application can access vehicle data (e.g., temperature sensor data) associated with the vehicle that the user is driving to determine whether the automated assistant application is able to generate a response for the third-party agent.

If the automated assistant application determines that the vehicle data is sufficient for generating a response to the third-party agent, the automated assistant application can query the user for permission to respond to the third party agent. For example, the third-party agent can ask about a status of the brakes of the vehicle, which may have been repaired or installed by a company that manages the third party agent. The automated assistant application can receive a notification asking the status of the brakes and use brake sensor data from the vehicle to generate content for a responsive message to be sent back to the third party agent. The automated assistant application can notify the user of the notification from a third-party agent and ask permission for responding to the third party agent (e.g., "1 received a message from the company that repaired your brakes and I can provide a response to them. Would you like me to send your current break sensor data to the company?"). If the user responds positively, or otherwise provides permission for the automated assistant application to respond to the third party agent, the automated assistant application can send the break sensor data to the third party agent, thereby minimizing the amount of engagement the user has with the company and/or the third party agent. This can allow the user to operate their vehicle with less distraction, while also providing a means through which vehicle manufacturers and vehicle service providers can receive feedback regarding their vehicles and/or their services.

FIG. 1 provides a diagram 100 that illustrates an automated assistant 104 that is capable of tailoring the sending and/or receiving of messages or notifications to a user. Specifically, the automated assistant 104 can modify how a user typically receives messages or indications from the automated assistant 104 to reduce distractions, such as when a user is operating a vehicle 116. In this way, the automated assistant 104 can reduce a number of distractions that would otherwise interfere with the user, and preserve computational resources otherwise expended on repetitiously conducting multiple interactions between the user and the automated assistant 104.

The automated assistant 104 can be hosted at a remote device 112, such as a server device 102, and/or one or more computing devices capable of hosting an assistant application. For example, in some implementations, the automated assistant 104 can be hosted at a personal computing device 140, a vehicle computing device 122, and/or the remote device 112. Processes or functions performed by the automated assistant 104 can be performed by the server device 102, or distributed over separate devices. For instance, a user can provide an input, such as a voice command or a textual input, at an assistant interface 142 of the personal computing device 140. The input from the user can be transmitted from the personal computing device 140, over a network 114, such as a private or public network (e.g., the internet), to the server device 102. When the input is a voice command, or other audible input from the user, the input can be received at a voice to text engine 108, which can be part of the automated assistant 104 or separate from the automated assistant 104. The voice to text engine 108 can convert the input into text, which can be parsed by the automated assistant 104 to determine how the automated assistant 104 can sufficiently respond to the input from the user.

Interactions between one or more users and the automated assistant 104 can be stored as assistant interaction data 106. The assistant interaction data 106 can, for example, provide correspondence data that identifies one or more inputs received from the one or more users and one or more responses generated from the automated assistant 104. The automated assistant 104 can employ one or more machine learning algorithms for learning or otherwise adapting to user requests, preferences, and/or how the user otherwise interacts with the automated assistant 104. In some implementations, the server device 102 and/or the automated assistant 104 can include an engagement prediction engine 110. The engagement prediction engine 110 can be an application, script, and/or other executable data capable of determining or otherwise estimating an amount of engagement for a user to exhibit in order to elicit a response or other output from the automated assistant 104.

The engagement prediction engine 110 can process the assistant interaction data 106 in order to generate data (e.g., metrics) that indicates a level or rank of complexity for receiving particular responses from the automated assistant 104. For instance, the assistant interaction data 106 can include data corresponding to an interaction when the automated assistant 104 previously indicated to the user that the user was receiving an incoming call while the user was driving the vehicle 116. The assistant interaction data 106 can provide further data indicating that the user responded to the automated assistant 104 positively, thereby accepting the call while driving the vehicle 116. In this instance, a single output was provided by the automated assistant 104 and a single response was provided by the user, therefore the engagement between the automated assistant 104 and the user was minimal. When the user receives similar incoming call-related notifications from the automated assistant 104, the engagement prediction engine 110 can generate data, such as a score or a metric, that quantifies the engagement that will be exhibited by the user, or required by the user to respond to the automated assistant 104, will be less than a majority of other interactions processed by the engagement prediction engine 110.

Comparatively, the automated assistant 104 can provide an output indicating that the user has received a message from an acquaintance. In response, the user can request that the message be read to the user by the automated assistant 104. The automated assistant 104 can then read the content of the message to the user, and, if the content contains one or more queries for the user, the automated assistant 104 can ask the user whether they would like to reply to the message. In response, the user can positively reply to the automated assistant 104 and provide responsive content to be received by the acquaintance via a message generated by the automated assistant 104. When the user receives similar messages from the acquaintance via the automated assistant 104, the engagement prediction engine 110 can generate data that indicates the engagement that will be exhibited by the user, or required by the user, to respond to the automated assistant 104, will be greater than the amount of engagement exhibited when responding to an incoming call (e.g., such as the aforementioned example of the user being notified of a call while the user is operating the vehicle 116). In this way, the engagement prediction engine 110 and/or the automated assistant 104 can track data that indicates a level of engagement for particular notifications and/or interactions between the user and the automated assistant 104.

In some implementations, the engagement prediction engine 110 can estimate a level of operational engagement of a user based on a number of maneuvers, a number of turns, a property of a turn (e.g., angle, radius, time to complete, etc.), traffic conditions, changes in elevation, changes in speed, a number of intersections, a distance to an upcoming navigation step, and/or any other property of a route navigation being undertaken by a user that is traveling within the vehicle 116. Operational engagement, and/or any data associated with operational engagement can be used by the automated assistant 104 for making determinations about when and/or how to present a notification to a user. The engagement prediction engine 110 can estimate the levels of operational engagement for various routes using data from a variety of sources. For example the vehicle computing device 122 can include one or more vehicle applications 126, which can provide navigation and/or vehicle related data to the server device 102 via the network 114.

In some implementations, sensors located at, and/or otherwise associated with, the vehicle 116 can generate vehicle data 128, which can also be transmitted to the server device 102 via the network 114. In some implementations, the personal computing device 140 can include applications capable of communicating with the vehicle computing device 122 and/or communicating with the server device 102. The engagement prediction engine 110 can use the vehicle data 128, the data from the vehicle applications 126, the data from the personal computing device 140, and/or any other data that can be associated with and/or indicative of a level of engagement exhibited, or otherwise expected from a user, to navigate or otherwise control the vehicle 116.

In yet other implementations, the vehicle computing device 122 can collect user interaction data 124 corresponding to interactions between the user and the vehicle 116 and/or the vehicle computing device 122. For instance, the user interaction data 124 can indicate that a user typically invokes a media streaming application of the vehicle applications 126 a majority of a time when the user is navigating the vehicle 116 to work in the morning. Therefore, because the user has personally elected to use the media streaming application of the vehicle applications 126 while navigating the vehicle, a predicted level of operational engagement generated for a morning work route navigation can be estimated to be low relative to other route navigations. Furthermore, a predicted level of application engagement generated by the engagement prediction engine 110 for operating the media streaming application can be low relative to other applications the vehicle computing device 122 can operate while navigating a route with the vehicle 116.

As an example, and in some implementations, while the user is navigating the vehicle 116, the automated assistant 104 can receive an indication or other data indicating that an acquaintance 138 is attempting to contact the user using a message generated at a contacting computing device 130, such as a tablet computing device 120. The automated assistant 104 can determine, using account data available to the automated assistant 104, that the personal computing device 140 of the user is paired with the vehicle computing device 122. Therefore, the automated assistant 104 has the option to send the message from the acquaintance 138 to either a vehicle application 126 or a message application of the personal computing device 140. However, the automated assistant 104 can determine whether to provide the message in full, summarize the message for the user, automatically respond on behalf of the user and provide the response to the user, automatically respond on behalf of the user and delay providing the response to the user, and/or otherwise modify the receipt of the message by the user. Such modifications to the presentation or provision of the message can be based on a content of the message, a context of the message, the assistant interaction data 106, the user interaction data 124, the vehicle data 128, an estimate of operational engagement, an estimate of application engagement, and/or any other data generated by the engagement production engine 110 and/or the automated assistant 104. This technique for transmitting information can mitigate risks of injury to the user and also preserve computational resources at the various devices involved in transmissions of data.

In some instances, when the automated assistant 104 elects to bypass transmitting a message or notification to the personal computing device 144 and/or the vehicle computing device 122, the message can originate at a third-party agent 136 hosted at the contacting computing device 130. For example, the contacting computing device 130 can be associated with a company that provides services associated with vehicles, such as the vehicle 116. The third party agent 136 can be a third-party assistant application that is established by the company to collect the vehicle data 128 from the vehicle 116.

The third party agent 136 can provide a message to the automated assistant 104 for receipt by the user. The automated assistant 104 can parse the message to identify a query within contents of the message. The message can be, for example, "Hi Jack, we recently plugged a hole in your tire. Has the air pressure in your tire been constant since?" The automated assistant 104 can identify the query requesting the tire air pressure data. The automated assistant 104 can thereafter determine whether the vehicle data 128 includes tire pressure data that has been collected since the service was performed by the company associated with the third party agent 136. The automated assistant 104 can access data related to services performed on the vehicle 116 by processing the vehicle data 128, invoking certain functions of the vehicle applications 126, performing searches within account data available to the automated assistant 104 (with permission from the user), and/or any other source of data indicative of recent services performed on the vehicle 116.

The message and/or query of the message can be processed by the engagement prediction engine 110 in order to estimate on amount of application engagement that the user may exhibit in order to respond to the query. Because the query can be responded to with vehicle data 128 that is accessible to the automated assistant 104 without the user explicitly providing verbal content or some other physically exerted effort, the estimated amount of application engagement can be minimal compared to the user accepting a phone call or verbally providing content for a text message response. Furthermore, in response to receiving the message, the automated assistant 104 and/or the engagement prediction engine 110 can estimate a current and/or future amount of operational engagement that the user may exhibit when operating the vehicle 116. For example, if the user is on a particularly complicated route that is characterized by multiple turns within a minute time period, the amount of operational engagement can be estimated as higher than an amount of operational engagement that a user may exhibit when navigating the vehicle 116 without having any turns for more than one or more minutes.

When the amount of application engagement estimated by the engagement prediction engine 110 is low, and the amount of operational engagement estimated by the engagement prediction engine 110 is high, the automated assistant 104 can elect to provide a response to the third party agent 136 without immediately providing a response to the user. For instance, the automated assistant 104 can identify the tire air pressure data requested by the third party agent 136 and send the tire air pressure data back to the third party agent 136 without notifying the user via the vehicle computing device 122 and/or the personal computing device 140. Rather, at least based on a context of the message, such as a portion of the route being navigated by the user, the estimated application engagement, and/or the estimated operational engagement, the automated assistant 104 can delay notifying the user of (i) the message from the third-party agent 136 and/or (ii) the response that was provided by the automated assistant 104 to the third party agent 136.

Figure 2:
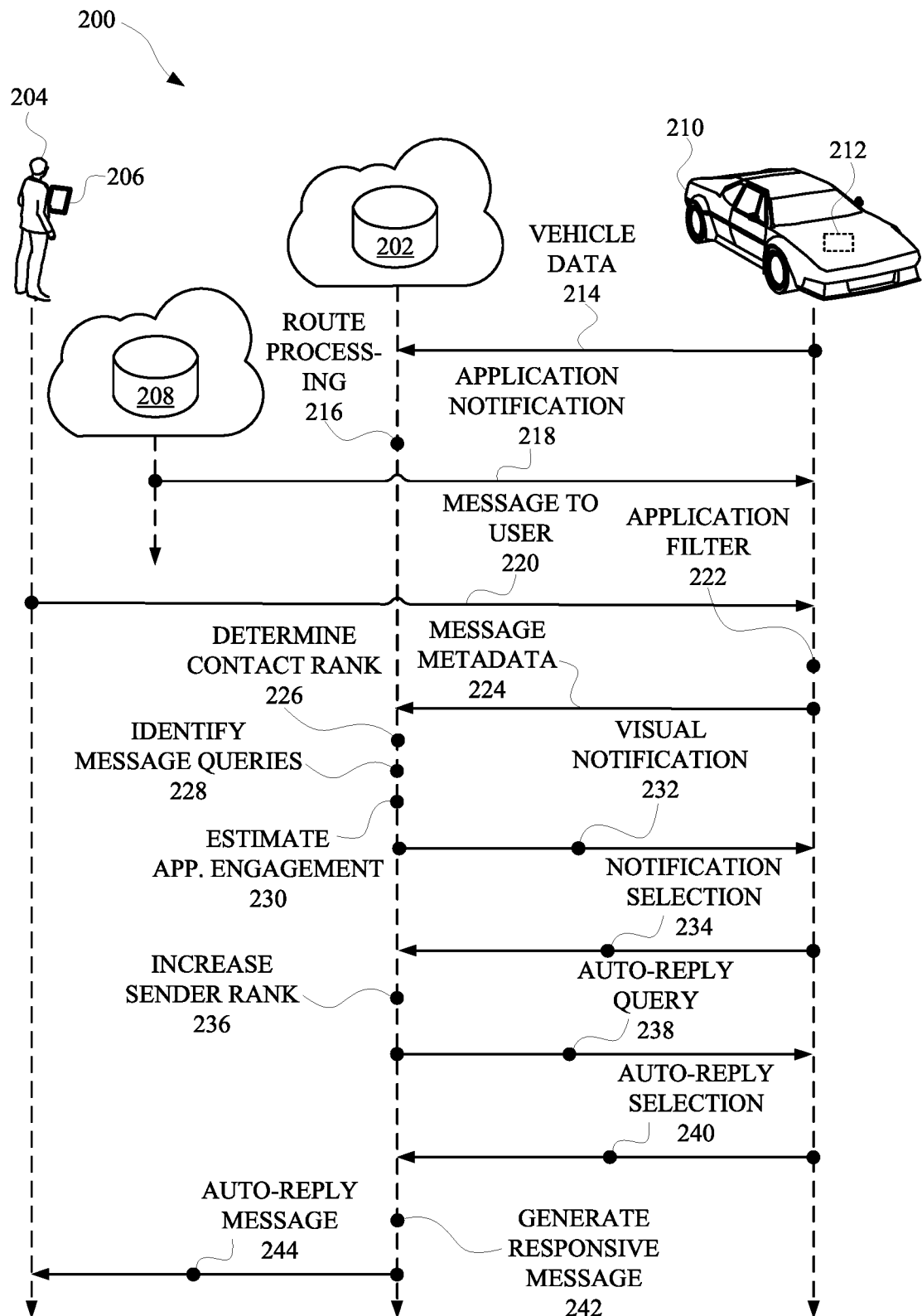
FIG. 2 illustrates a process diagram for using an automated assistant application to provide a responsive message on behalf of a user that is engaging in an activity.

FIG. 2 illustrates a process diagram 200 for using an automated assistant application to provide a responsive message on behalf of a user that is engaging in an activity. One or more steps or interactions described with respect to the process diagram 200 can be embodied in instructions that are executable by one or more computing devices that host, or are otherwise accessible to, an automated assistant application. The process diagram 200 can describe an interaction between a user that is navigating a vehicle 210, a separate user 204 that is operating a portable computing device 206, a remote computing device 202, such as a server device that hosts the automated assistant application, and/or a separate remote computer device 208, which can host one or more other applications. The vehicle 210 being operated by the user can include one or more computing devices 212, which can communicate with the automated assistant application via a network protocol such as LTE, Wi-Fi, Bluetooth, and/or any other medium through which a network can be accessed. Furthermore, the user can operate, or at least be proximate to, a personal computing device that is paired, or otherwise in communication, with the one or more computing devices 212 of the vehicle 210.

The process diagram 200 can include a transaction where vehicle data 214 is transmitted from a computing device 212 of the vehicle 210 to the remote computing device 202, the vehicle data 214 can include sensor data, user interaction data, data collected from the personal computing device of the user, navigation data, environmental data, and/or any other data that can be associated with or accessible to a computing device of a vehicle. The automated assistant application can receive the vehicle data and determine that the user is operating the vehicle 210. For instance, the vehicle data 214 can include details of an excursion, or a route that is being taken by the user, in order to arrive at a particular destination. Therefore, the automated assistant application can be put on notice that the user is distracted by, or otherwise engaged in, the operation of the vehicle 210.

The process diagram 200 can also include a transaction associated with route processing 216. Route processing can include analyzing different portions of the route (e.g., using geolocation data) being taken by the user in order to determine predicted levels of operational engagement corresponding to the different portions of the route. For example, a predicted level of operational engagement for a portion of the route, corresponding to an extended period of time driving on a highway, can be less than a predicted level of operational engagement for a different portion of the route corresponding to side streets, alleys, driveways, and/or any other non-highway portions of the route. In some implementations, this transaction can be optional, as the automated assistant application may elect to not consider predicted levels of operational engagement that are based on whether a user is navigating the vehicle 210.

Additionally, the process diagram 200 can include receiving an application notification 218. The application notification 218 can be received from a separate remote computing device 208, which can host one or more different applications. For example, an application of the one or more different applications can include a shopping application, and the application notification 218 can identify a deal being offered by the shopping application. However, because the user is operating the vehicle 210, the automated assistant application can elect, based on a ranking process or learning process, to delay the presentation of such notifications until the user is not as engaged in another activity (e.g., driving the vehicle 210).

The process diagram 200 can further include a transaction corresponding to sending a message to the user 220. In some implementations, the message to the user can be associated with a group chat or multi-user chat application that the user employs to simultaneously chat with multiple different people. The message from the separate user 204 can include one or more queries, along with other content that may not the intended to elicit a response from the user.

The process diagram 200 can additionally include a transaction for applying an application filter 222. Specifically, the transaction of applying the application filter 222 can be performed by the automated assistant application at the remote computing device 202 and/or the computing device 212 of the vehicle 210. By filtering the applications and/or notifications associated with one or more applications accessible to the automated assistant application, the automated assistant application is able to prioritize the notifications to be received by the user. For instance, because the automated assistant application was notified that the user is operating the vehicle 210, the automated assistant application can delay application notifications from the shopping application but present notifications associated with messaging applications. Alternatively, the automated assistant application can delay application notifications from the shopping application but modify the presentation of notifications associated with the messaging applications. Additionally, notifications from the messaging applications can be filtered according to who is sending the messages to the user.

In some implementations, application filtering can be performed at the vehicle computing device 212. Any applications that are considered to be ranked high enough or important enough for the user to receive notifications while driving can be permitted by the vehicle computing device 212 to send notifications to the user. Identifiers for one or more selected applications can thereafter be communicated to the automated assistant application or the remote computer device 202. Alternatively, data associated with a selected application can be transmitted to the automated assistant application or the remote computing device 202 for further processing. For example, the process diagram 200 can include a transaction for transmitting message metadata 224. The message metadata 224 can be transmitted as a result of the computing device 212 determining that the application that received the message should have priority over the shopping application, which was attempting to notify the user of a recent deal. Application priority can be determined based on past user interactions with the automated assistant application, data generated based on past user interactions with various applications accessible to the automated assistant application, contextual data associated with the applications from which the notifications are received, and/or any other data from which a priority of a notification and/or an application can be based. The metadata can identify a name of the contact sending the message, a heading of a message, content of the message, time data associated with the message, and/or any other data that can be associated with the sending and/or receiving of a message.

Furthermore, the process diagram 200 can include a transaction of determining contact rank 226. Determining contact rank 226 can include identifying or accessing a ranking of contacts with which the user has previously communicated. The automated assistant application can generate rankings for contacts (e.g., identified in the metadata) according to how often the user responds to the contact, how often the contact communicates with the user, and/or processing application data that is associated with the contacts (e.g., calendar application data, social networking application data, etc.). For example, a spouse of the user can be ranked higher than a co-worker the user, at least based on data that indicates the user communicates with the spouse more frequently than the coworker.

The process diagram 200 can further include a transaction to identify message queries 228. The message queries can be embodied as questions or other statements made within the content of the received message. In some implementations, the content of the message can be associated with an image and/or text. For example, the text of the message can include a question such as, "Do you know what kind of pepper this is?," and the image provided with the message can correspond to a captured image of a poblano pepper.

The process diagram 200 can optionally include a transaction of estimating application engagement 230. An estimate of application engagement can be generated by the automated assistant application based on past interactions with the application (e.g., the messaging application), contextual data associated with previous interactions with the application, perceived movement of the user while interacting with the application (e.g., eye movement, hand motions, geolocation data, etc.) and/or any other data from which an amount of engagement with an application can be inferred. For example, because the aforementioned message includes both text and an image, the automated assistant application can generate an estimate of application engagement that would be exhibited by the user in order to leave a message and/or respond to the message. The estimate of application engagement can then be compared to one or more thresholds that correspond to message provisions that can be selected by the automated assistant application in order to mitigate distractions experienced by the user. For example, an estimate of application engagement that is lower than a first threshold can indicate to the automated assistant application that the user can receive a notification in full without being distracted. However, when the estimate of application engagement is higher than the first threshold, the automated assistant application can provide the notification in a condensed format (e.g., as less text than the full text message). When the estimate of application engagement is higher than a second threshold, the notification can be provided to the user as an image or icon that merely indicates a message was received from the separate user 204.

The process diagram 200 can include a transaction of providing the visual notification 232 at the computing device 212 of the vehicle 210. The transaction of providing the visual notification 232 can be based on, or a result of, the automated assistant application determining that the message received from the separate user 204 would be too distracting to present to the user in a full or in a condensed format. Therefore, the automated assistant application can select to cause a visual stimulus to be presented at a graphical user interface located within the vehicle of 210.

When the user selects to receive the full message, or at least some data related to the message, then the transaction corresponding to the notification selection at 234 can occur. In other words, the computing device 212, or the personal computing device of the user, can provide an indication to the automated assistant application that the user would like to view the message and/or provide a response to the separate user 204.

Optionally, in response to the user selecting to view the notification, a transaction of increasing sender rank 236 can be undertaken by the automated assistant application. Specifically, the automated assistant application can increase a contact rank of the separate user at least based on the fact that the user elected to receive or respond to the notification associated with the separate user 204, despite the user operating the vehicle on 210. In this way, the automated assistant application can track a ranking of contacts in real time as the user acknowledges or ceases to acknowledge messages from different contacts.

The process diagram 200 can also include a transaction of sending an auto-reply query 238. The auto reply query can cause the user to be presented with a query regarding whether the automated assistant application has permission to respond to the separate user 204 on behalf of the user. In other words, the automated assistant application can provide a visual query (e.g., presenting text at an interface) and/or an audible query, which can be output from an audio system of the vehicle 210. The audible query can include, for example, "Your husband asked you what kind of pepper is in an image, and I can respond on your behalf. Would you like me to respond on your behalf?"

If the elects to grant permission to the automated assistant application, then the transaction of sending an auto-reply selection 240 can be executed. In the aforementioned example, the automated assistant application can identify the query ("Do you know what kind of pepper this is?"), correlate the query to the image, and search for an answer to the query. For instance, the automated assistant application can perform an image search of the internet using at least some amount of data based on the image received from the separate user 204 (with permission from the separate user 204 and/or the user), and determine whether an answer to the query is provided in the search results. If an answer is provided in the search results (e.g., a majority of search results indicate that the image from the separate user 204 includes a poblano pepper), the automated assistant application can undertake a transaction of generating a responsive message 242 (e.g., "That is a poblano pepper.").

As a result of the user granting permission to the automated assistant application to respond on behalf of the user, and the automated assistant application identifying information that is sufficient to answer the query, the automated assistant application can undertake a transaction of transmitting an auto-reply message 244 to the separate user 204. In this way, the automated assistant application is able to adapt to situations where the user may be distracted by notifications that would typically be unregulated. Furthermore, computational resources can be preserved by not providing every notification to the user. For instance, this can preserve computational resources associated with generating images at display devices associated with the user, providing audio output at devices associated with the user, and/or otherwise communicating redundantly over various electrically powered network connections.

Figure 3:
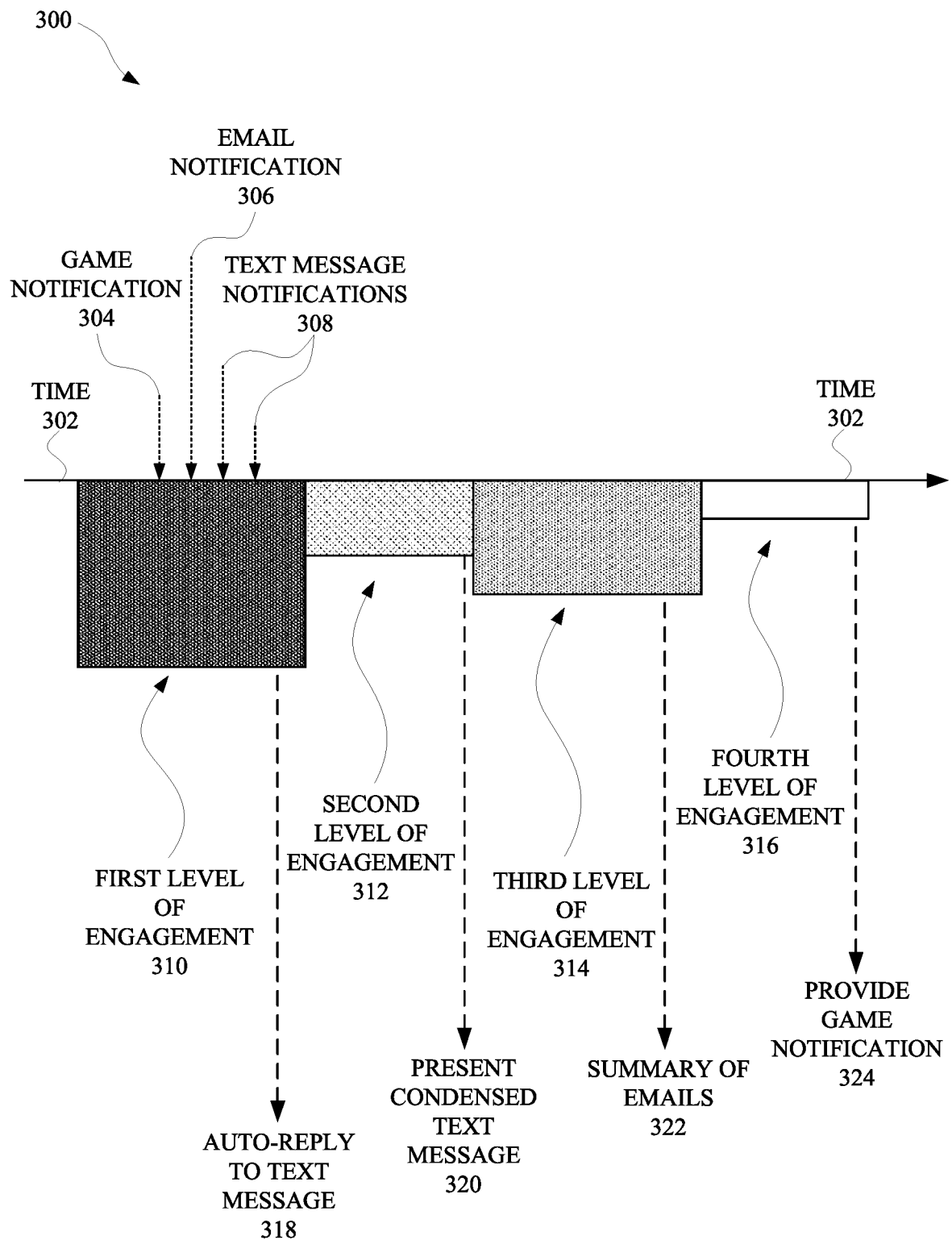
FIG. 3 illustrates a state diagram that provides an example of how various notifications can be modified and/or presented by an automated assistant to a user according to predicted levels of engagement of the user.

FIG. 3 illustrates a state diagram 300 that provides an example of how various notifications can be modified and/or presented by an automated assistant to a user according to predicted levels of engagement of the user. The state diagram of 300, and/or the examples described with respect to the state diagram 300, can be embodied as instructions executable by one or more processors of one or more computing devices. For instance, the examples described with respect to state diagram 300 can be implemented through a series of steps taken by an assistant application and/or any other application capable of receiving and/or sending notifications.

The state diagram 300 can identify a period of time 302, which provides a temporal relationship between activities and/or steps occurring at the state diagram 300. For instance, an automated assistant application can track levels of engagement that a user exhibits, or is predicted to exhibit, over a period of time 302. The levels of engagement can correspond to one or more activities such as, for example, navigating a vehicle through a route, work-related activities, activities performed over a period(s) of time, and/or any other tasks from which data can be gathered by the automated assistant application. The automated assistant application, and/or an engagement prediction engine, can predict various levels of engagement for a user based on data associated with activities of the user, contextual data, geolocation data, calendar data, pattern data associated with frequent user activities, and/or any other data.

As an example, the state diagram 300 can describe a time 302 when the user is navigating a vehicle through a route having a variety of conditions that affect the level of engagement of the user. The route can be processed by the assistant application, and/or any other process, in order to generate various predicted levels of engagement for different portions of the route. For instance, a first level of engagement 310 can correspond to a first portion of a route that is particularly complicated, as it requires the user to navigate out of their neighborhood and onto the expressway. Because of the timing of the first portion of the route, the user may receive a variety of different notifications. The variety of notifications can include a game notification 304, an email notification 306, and text message notifications 308. The automated assistant application can modify how each of the notifications are presented to the user according to at least the levels of engagement and/or any other data that can be associated with activities of the user.

For instance, although the notifications are all received while the user is predicted to be exhibiting the first level of engagement 310, the automated assistant application can elect to perform a function associated with the text message notifications 308. Specifically, the user can specify contacts that should receive auto replies when the user is driving or regardless of a level of engagement of the user. Thereafter, the automated assistant application can receive a text message notification 308 and determine that one of the text messages corresponds to a specified contact that should receive an auto reply. The automated assistant can then identify the first level of engagement 310 of the user and generate an auto reply according to the first level of engagement 310. For example, the first level of engagement 310 can exceed an engagement threshold thereby causing the automated assistant application to not notify the user that an auto reply to the text message 318 was performed.

As the user continues navigating the vehicle on the route, the user can reach a portion of the route corresponding to a second level of engagement 312. The second level of engagement can be at or below the engagement threshold, thereby causing the automated assistant application to present a condensed text message 320 to the user. In other words, because the second level of engagement 312 is below the engagement threshold, the user can receive particular notifications or messages that would not be as distracting as if they were received by the user during the initial portion of the route.

In some implementations, the user can be provided, by the automated assistant application, with the option to receive certain notifications in a different modality. For example, when the user is navigating the vehicle through a portion of the route corresponding to a third level of engagement 314, the automated assistant application can inquire whether the user would like to receive their email messages in an audible format and as a summary of emails 322. In this way, the user would not necessarily have to take their eyes off the road to receive their email messages, thereby reducing a number of distractions and mitigating power consumption by not displaying email messages at a display device. The user can request that the automated assistant application present summaries of the emails (e.g., "Tell me who my emails are from and the subject lines of the emails"), or the automated assistant application can infer how much of the emails the user would like to hear based on past interactions between the user and the automated assistant application. For instance, the user may have previously requested the automated assistant application to only read the first couple sentences of each of their unopened emails. Therefore, as the user is driving and the level of engagement decreases, the automated assistant application can choose to provide email notifications wherein the first few sentences of each unopened email are audibly presented.

At a certain portion of the route, the user can exhibit a fourth level of engagement 316, as predicted by the automated assistant application. The fourth level of engagement 316 can be less than the other levels of engagement, thereby putting the automated assistant application on notice that the user is not particularly engaged in the activity they are performing. As a result, the automated assistant application can provide any remaining notifications that were not previously provided during the vehicle navigation. For example, the automated assistant application can provide game notifications 324 to the user when the user is at a portion of the route (e.g., a stop at a red light, parking in a driveway, etc.) corresponding to the fourth level of engagement 316. Furthermore, because the fourth level of engagement 316 is less than the other levels of engagement, the modality through which the notifications are received can be unchanged compared to previous times when the user has received similar notifications (e.g., game notifications presented at a display device).

Figure 4:
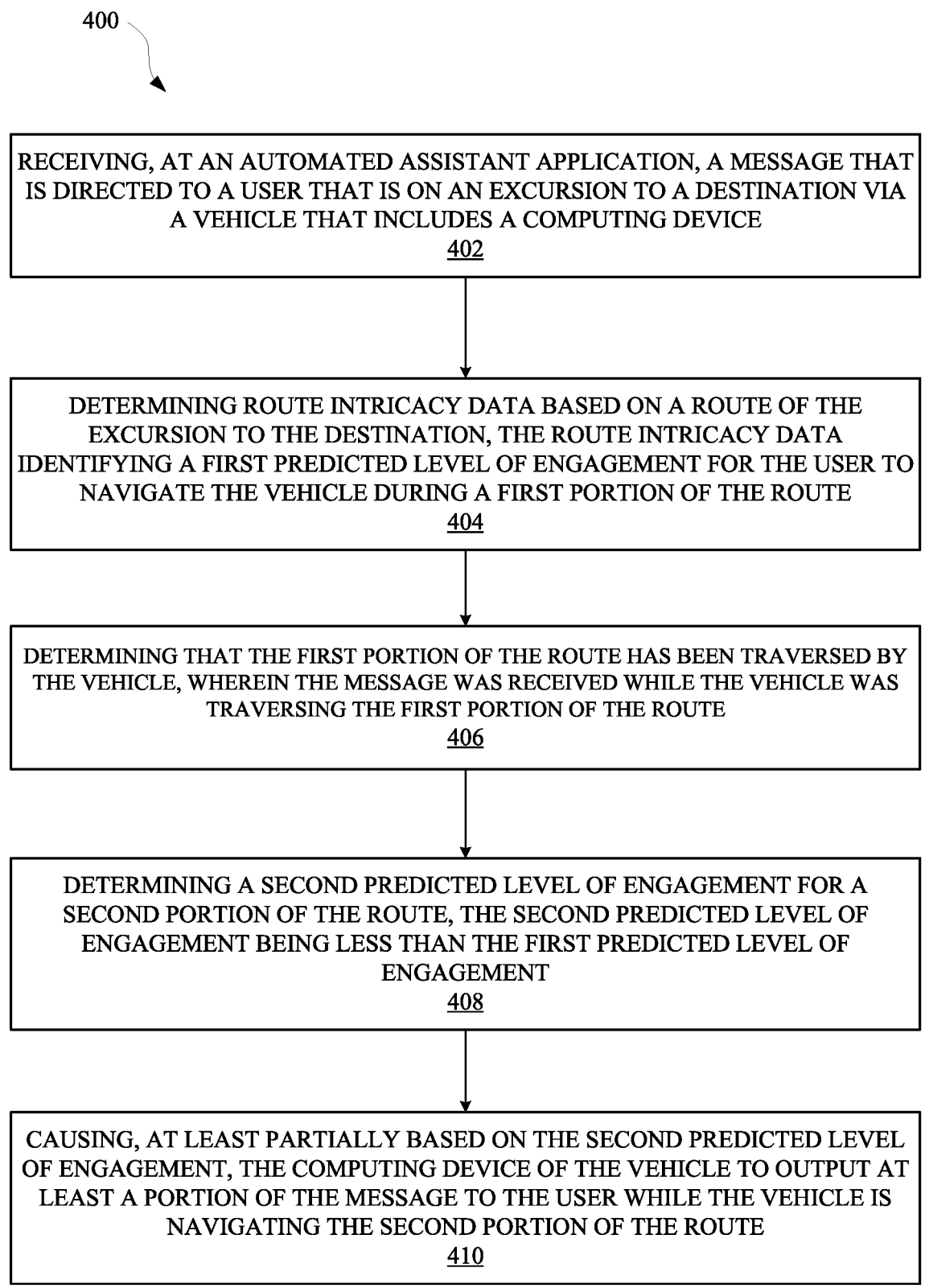
FIG. 4 illustrates a method for providing a message to a user at least partially based on a predicted level of engagement the user can be expected to, or otherwise may be required to, exhibit while navigating a vehicle through a route.

FIG. 4 illustrates a method 400 for providing a message to a user at least partially based on a predicted level of engagement the user can be expected to, or otherwise may be required to, exhibit while navigating a vehicle through a route. The method 400 can be performed by an assistant application, a computing device, and/or one or more devices capable of providing notifications and/or messages to a user. The method 400 can include a block 402 of receiving, at an automated assistant application, a message that is directed to a user that is on an excursion to a destination via a vehicle, which includes a computing device. The computing device included in the vehicle can be accessible to the automated assistant application. For instance, the automated assistant application can be at least partially stored at the vehicle computing device and/or be at least partially stored at a remote computing device that is in communication with the vehicle computing device over one or more direct or indirect network connections.

The method 400 can further include a block 404 of determining route intricacy data based on a route of the excursion to the destination. The route intricacy data can identify a first predicted level of engagement for the user to navigate the vehicle during a first portion of the route. The route intricacy data can be generated by the automated assistant application and/or an engagement prediction engine that is in communication with the automated assistant application. The route intricacy data can be determined specifically based on properties of the route of the excursion to the destination. Such properties can include a number of turns, a number of expected speed changes, weather that is predicted to affect the route, traffic that is predicted to affect the route, elevation changes associated with the route, a number of intersections in the route, a number of traffic signs or a number of legal requirements for navigating the route, and/or any other feature of the route that can make the route more or less complicated to navigate. The properties of the route can be identified from data that is stored by device that also hosts the automated assistant application, and/or from data that is available at separate devices but are otherwise associated with entities that have information regarding the route.

The method 400 can also include a block 406 of determining that the first portion of the route has been traversed by the vehicle. The message can be received by the automated assistant application while the vehicle traversed the first portion of the route. For instance, the message can be an SMS message or text message that is transmitted from a separate computing device associated with an acquaintance of the user. While the user is driving or otherwise navigating their vehicle through the first portion of the route, the message can be received from the separate computing device at the automated assistant application.

The method 400 can additionally include a block 408 of determining a second predicted level of engagement for a second portion of the route. The second predicted level of engagement can be less than the first predicted level of engagement. For instance, the first predicted level of engagement can be characterized as a score or metric that is higher than that of the second predicted level of engagement. Therefore, the first portion of the route can be more complicated, include more maneuvers, be more affected by environmental conditions, and/or otherwise necessitate a level of engagement from the user that is higher than a level of engagement determined for the second portion of the route. For example, the first portion of the route can have more intersections than the second portion of the round, and/or the first portion of the route can include more turns than the second portion of the route.

Furthermore, the method 400 can include a block 410 of causing, at least partially based on the second predicted level of engagement, the computing device of the vehicle to output at least a portion of the message or a summary of the message to the user while the user is navigating the second portion of the route. In other words, because the automated assistant application determined that although the message was received while the user was navigating the first portion of the route, the automated assistant application acknowledged that the message might distract the user while navigating the first portion of the route. Furthermore, the automated assistant application thereafter identified a subsequent portion of the route (i.e., the second portion of the route) that required less engagement from the user to navigate. The automated assistant application then modified a provision, or otherwise delayed the presentation, of the message so that the message would be received while the user was navigating the second portion of the route.

Figure 5:
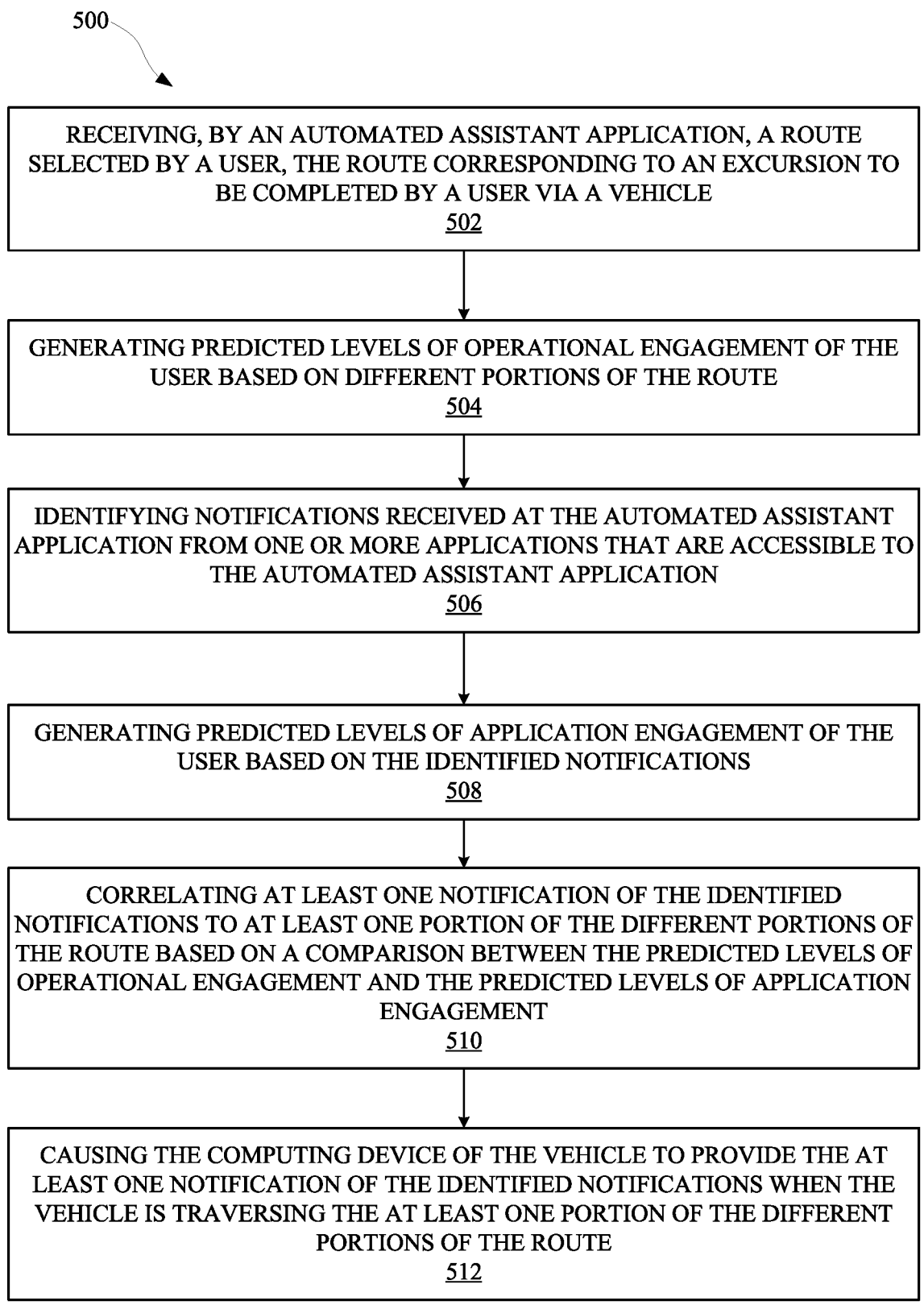
FIG. 5 illustrates a method for providing a notification to a user based on predicted or determined levels of operational engagement and/or application engagement.

FIG. 5 illustrates a method 500 for providing a notification to a user based on predicted or determined levels of operational engagement and/or application engagement. The method 500 can be performed by an automated assistant application, a computing device, and/or one or more devices capable of transmitting a message or notification to a user.

The method 500 can include a block 502 of receiving, by an automated assistant application, a route selected by a user. The route that correspond to an excursion to be completed by a user via a vehicle that includes a computing device that is accessible to the automated assistant application. The excursion can be a trip to a house owned by a friend of the user, and the user can drive their vehicle to the house using directions that are provided by the automated assistant application and/or the computing device of the vehicle.

The method 500 can further include a block 504 of generating predicted levels of operational engagement of the user based on different portions of the route. The predicted levels of operational engagement can quantify varying amounts of attention that the user can exert, or be estimated to exert, in order to navigate the vehicle during the different portions of the excursion or route. For instance, a portion of a route that includes multiple turns within a particular distance or time period can correspond to a higher predicted level of operational engagement than a portion of the route that does not include multiple turns, or includes less turns, within the particular distance or time period.

The method 500 can also include a block 506 of identifying notifications received at the automated assistant application from one or more applications that are accessible to the automated assistant application. For instance, the notifications can be provided by, or otherwise correspond to, a variety of different applications that provide media to the user through a variety of different modalities. The different modalities can include audio, video, still images, text, augmented reality, streaming broadcasts, physical sensations such as vibrations, and/or any other medium through which a user can receive notifications.

The method 500 can additionally include a block 508 of generating predicted levels of application engagement of the user based on the identified notifications. The predicted levels of application engagement can quantify varying amounts of cognition, or expected amounts of cognition, that the user can exert when at least receiving the notifications or responding to the notifications. For instance, a predicted level of application engagement for responding to a text message with specific content verbally provided by a user can be higher than a predicted level of application engagement for accepting a phone call from a friend. As another example, a predicted level of application engagement for viewing an image provided by a web service or through a text message can be higher than providing permission to the automated assistant application to send vehicle data to a company or a third party agent application.

The method 500 can further include a block 510 of correlating at least one notification of the identified notifications to at least one portion of the different portions of the route. The correlation can be based at least on a comparison between the predicted levels of operational engagement and the predicted levels of application engagement. In other words, the automated assistant application can compare the predicted levels of operational engagement for different portions of the route to predicted levels of application engagement associated with the notifications. The automated assistant application can then determine the notifications that would be appropriate to provide to the user at certain portions of the route. For example, a portion of the route associated with the least predicted level of operational engagement can be correlated to any of the notifications identified because the user is predicted to not be particularly engaged while navigating that portion of the mute. However, a portion of the route associated with the highest predicted level of operational engagement can be correlated to one or more notifications associated with a least predicted level of application engagement. The aforementioned correlation is based on the assumption that the user will be exhibiting a heightened level of engagement while navigating the portion of the route and, therefore, any notifications requiring some amount of engagement may cause the user to become distracted.

Additionally, the method 500 can include a block 512 of causing the computing device of the vehicle to provide the at least one notification of the identified notifications when the vehicle is traversing the at least one portion of the different portions of the route. In some implementations, the notification can be provided in full, in part, in a condensed format, in a separate medium than originally submitted the automated assistant application, and/or in a format having some modified provision that is based on a predicted level of operational engagement and/or a predicted level of application engagement.

Figure 6:
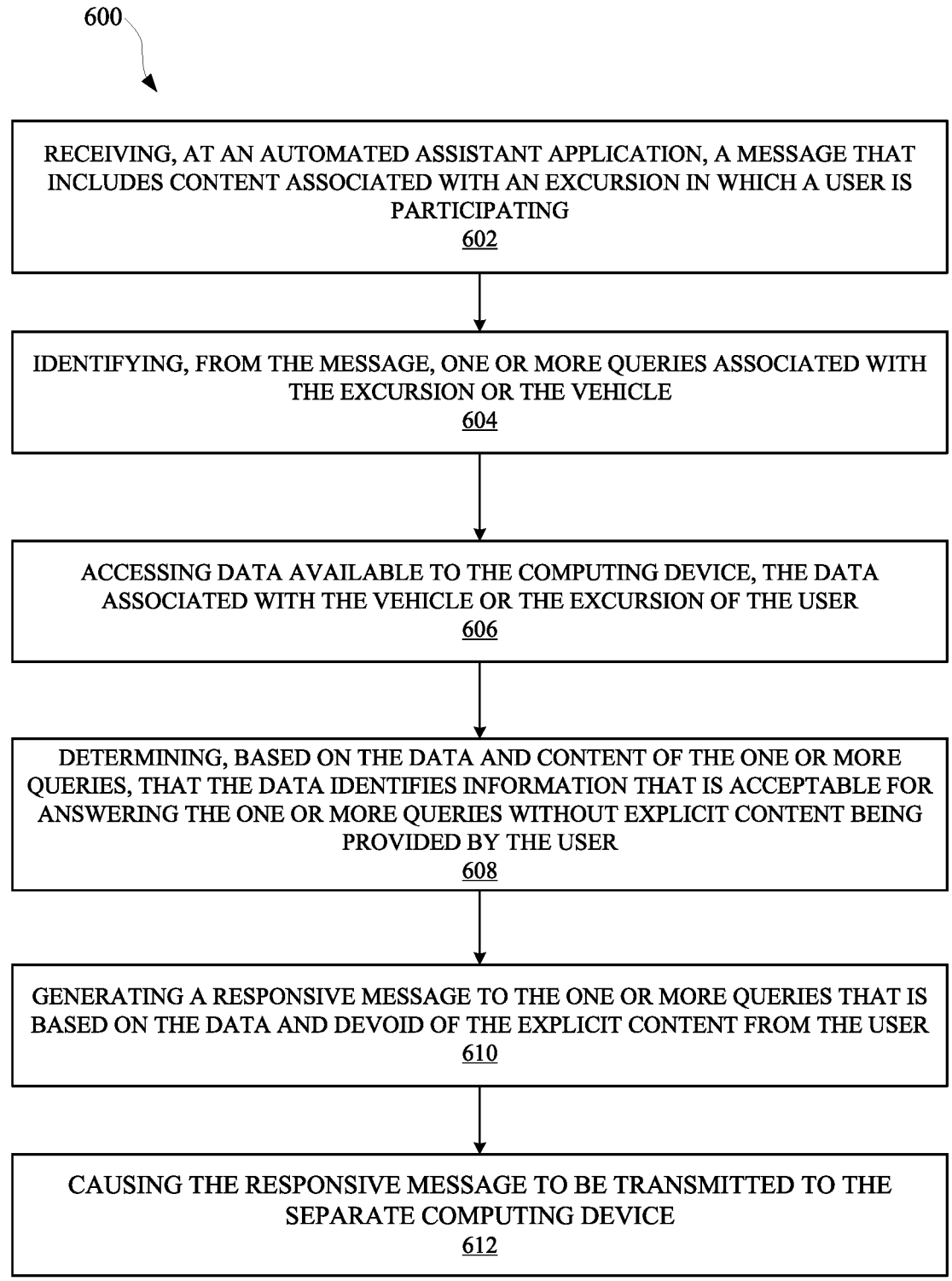
FIG. 6 illustrates a method for automatically responding to a message from a person based on content of the message and data available to an automated assistant application.

FIG. 6 illustrates a method 600 for automatically responding to a message from a person based on content of the message and data available to an automated assistant application. The method of 600 can be performed by an automated assistant application, a computing device, and/or one or more devices capable of providing a response to a message received at a computing device. The method 600 can include a block 602 of receiving, at an automated assistant application, a message that includes content associated with an excursion in which a user is participating. The user can participate in the excursion using a vehicle that includes a computing device that is accessible to the automated assistant application. Furthermore, the message can be provided by, or originate from, a separate computing device associated with the person, a company, and/or any other entity capable of generating a message that can be sent to a computing device.

The method 600 can further include a block 604 of identifying, from the message, one or more queries associated with the excursion or the vehicle. For instance, a user can receive a message that includes a variety of content, as is typical with text messages between family, friends, and other acquaintances. The content of the message can include, for example, "Hey, we just got to the movie theater and this place is packed. When do you think you will get here?" The automated assistant application can parse the message to identify content that corresponds to queries and non-queries. For instance, the automated assistance application can identify queries in messaging by analyzing words that correspond to questions (e.g., who, what, when, where, how, etc.) and/or characters (e.g., "?") that signify a response is being solicited. Furthermore, the automated assistant application can filter and/or categorize the identified queries to determine whether the automated assistant application is capable of generating a response, on behalf of the user, to the identified queries.

The method 600 can also include a block 606 of accessing data available to the computing device. The data can be associated with the vehicle or the excursion or route of the user. For example, the automated assistant application can access navigation data that identifies an estimated time of arrival and a destination of the user. The automated assistant application can search locations (e.g., using geolocation data corresponding to the destination) at or near the destination to identify whether the destination is proximate to a location identified in the message (e.g., a movie theater). In accordance with the aforementioned example, the automated assistant application can search locations at or near the destination and determine that the destination corresponds to, or is otherwise located proximate to, a movie theater. As a result, the automated assistant application can have data available for responding to one or more queries provided in a message received by the automated assistant application.

The method 600 can additionally include a block 608 of determining, based on the data and content of the one or more queries, that the data identifies information that is acceptable for answering the one or more queries without explicit content being provided by the user. In other words, the automated assistant application can determine that the data accessible to the automated assistant application can be embodied as, or otherwise converted to, a responsive message. For instance, the destination identified in the navigation data can be determined by the automated assistant application to be sufficient to fulfill or answer one or more of the queries identified in the received message. Furthermore, the explicit content can refer to verbal or spoken language intended by the user to be converted into text and embodied as content for a message to be transmitted back to the sender of the originally received message.

The method 600 can further include a block 610 of generating the responsive message based on the data. The responsive message being devoid of the explicit content from the user. In other words, the responsive message can optionally be exclusively generated by the automated assistant application in response to receiving the original message. Furthermore, the responsive message can optionally incorporate the data identified from one or more applications and/or devices accessible to the automated assistant application. For instance, the responsive message can identify the destination that was embodied in the navigation data that is being used by the user in order to navigate the vehicle to the destination.

The method 600 can additionally include a block 612 of causing the responsive message to be transmitted to the separate computing device from which the originally received message was transmitted to the automated assistant application. In some implementations, the responsive message can be transmitted to the sender without the user being notified that the response of message was transmitted. In other implementations, the automated assistant application can notify the user that the automated assistant application has received a message from the sender and is able to respond to the sender without any input from the user, beyond optionally receiving permission to respond to the sender. In yet other implementations, the automated assistant application can respond to the sender with the responsive message and subsequently notify the user of the originally received message and/or the responsive message sent on behalf of the user.

Figure 7:
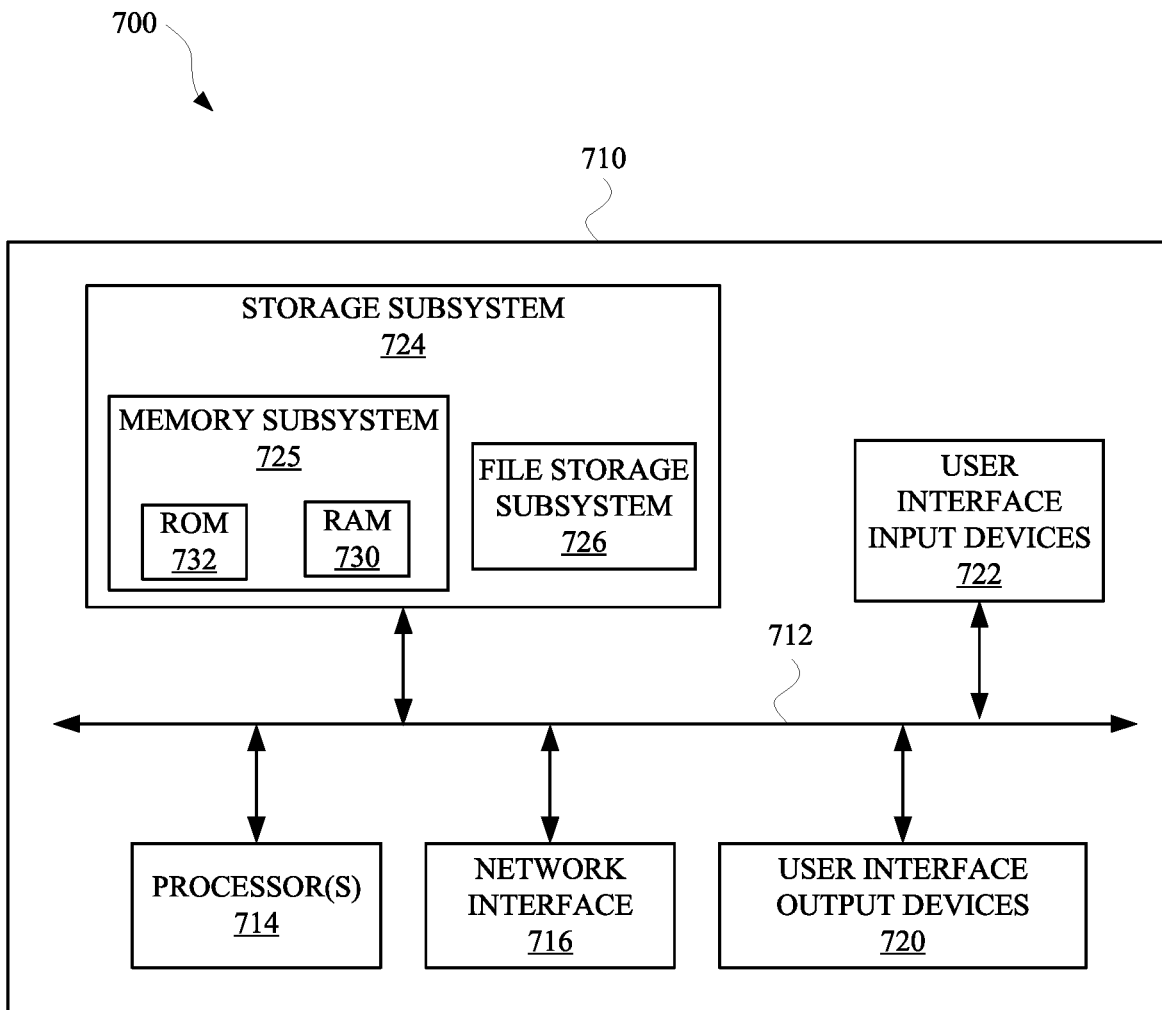
FIG. 7 is a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices.

In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 400, method 500, method 600, state diagram 300, and/or to implement one or more of the server device 102, the remote device 112, the engagement prediction engine 110, the automated assistant 104, the personal computing device 140, the vehicle computing device 122, the contacting computing device 130, the remote device 202, the remote device 208, the vehicle computing device 212, or the personal computing device.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

We claim:

1. A method implemented by one or more processors, the method comprising:
   identifying, at a vehicle computing device of a vehicle, an electronic notification designated for rendering to a user via the vehicle computing device;
   generating, by the vehicle computing device, a current predicted level of driving engagement being exerted in navigating the vehicle;
   selecting, based on both (i) one or more properties of the electronic notification and (ii) the current predicted level of driving engagement, a particular modality for rendering notification content that is based on the electronic notification, wherein selecting the particular modality is from amongst a plurality of candidate modalities, including:
      an audible only modality,
      a graphical only modality, and
      an audible and graphical modality;
   in response to determining that the current predicted level of driving engagement being exerted in navigating the vehicle is a first level of driving engagement:
      selecting, based on both (i) one or more of the properties of the electronic notification and (ii) the first level of driving engagement, the audible only modality as the particular modality for rendering the notification content;
   in response to determining that the current predicted level of driving engagement being exerted in navigating the vehicle is a second level of driving engagement:
      selecting, based on both (i) one or more of the properties of the electronic notification and (ii) the second level of driving engagement, the graphical only modality as the particular modality for rendering the notification content; and
   causing the vehicle computing to immediately render the notification content in the selected particular modality.

2. The method of claim 1, further comprising:
   generating the notification content as a function of the current predicted level of driving engagement.

3. The method of claim 2, wherein generating the notification content as a function of the current predicted level of driving engagement comprises:
   determining, based on a magnitude of the current predicted level of driving engagement, to generate, as the notification content, a condensed version of the electronic notification.

4. The method of claim 3, wherein the electronic notification includes text, and wherein the notification content, for the condensed version of the electronic notification, includes less text than the electronic notification.

5. The method of claim 1, further comprising:
   determining, based on both (i) the one or more properties of the electronic notification and (ii) the current predicted level of driving engagement, to immediately render the notification content in lieu of delaying rendering of the notification content;
wherein causing the vehicle computing device to immediately render the notification content is in response to determining to immediately render the electronic content in lieu of delaying rendering of the notification content.

6. The method of claim 1, further comprising:
in response to determining that the current predicted level of driving engagement being exerted in navigating the vehicle is a third level of driving engagement:
selecting, based on both (i) one or more of the properties of the electronic notification and (ii) the third level of driving engagement, the audible and graphical modality as the particular modality for rendering the notification content.

7. The method of claim 1, wherein the one or more properties of the electronic notification comprise one or more of: a type of the electronic notification, a source of the electronic notification, a time the electronic notification is received, or the notification content that is included in the electronic notification.

8. The method of claim 1, wherein selecting the particular modality for rendering the notification content that is based on the electronic notification is further based on past user interactions, of the user, with one or more past electronic notifications that include a same source as the electronic notification.

9. A method implemented by one or more processors, the method comprising:
identifying, at a vehicle computing device of a vehicle, an electronic notification designated for rendering to a user via the vehicle computing device;
generating, by the vehicle computing device, a current predicted level of driving engagement being exerted in navigating the vehicle;
determining, based on both (i) one or more properties of the electronic notification and (ii) the current predicted level of driving engagement, whether to generate notification content as a condensed version of the electronic notification, or to generate the notification content as a non-condensed version of the electronic notification;
generating, based on the determining, the notification content as either the condensed version or the non-condensed version;
determining, based on both (i) the one or more properties of the electronic notification and (ii) the current predicted level of driving engagement, to immediately render the notification content in lieu of delaying rendering of the notification content; and
in response to determining to immediately render the electronic content in lieu of delaying rendering of the notification content:
causing the vehicle computing to immediately render the notification content.

10. The method of claim 9, further comprising:
generating the notification content, as either the condensed version or the non-condensed version, as a function of the current predicted level of driving engagement.

11. The method of claim 10, wherein generating the notification content as a function of the current predicted level of driving engagement comprises:
determining, based on a magnitude of the current predicted level of driving engagement, to generate, as the notification content, the condensed version of the electronic notification.

12. The method of claim 11, wherein the electronic notification includes text, and wherein the notification content, for the condensed version of the electronic notification, includes less text than the non-condensed version of the electronic notification.

13. The method of claim 9, further comprising:
in response to determining that the current predicted level of driving engagement being exerted in navigating the vehicle is a first level of driving engagement:
determining, based on both (i) one or more of the properties of the electronic notification and (ii) the first level of driving engagement, to generate the notification content as the condensed version of the electronic notification.

14. The method of claim 13, further comprising:
in response to determining that the current predicted level of driving engagement being exerted in navigating the vehicle is a second level of driving engagement:
determining, based on both (i) one or more of the properties of the electronic notification and (ii) the second level of driving engagement, to generate the notification content as the non-condensed version of the electronic notification.

15. The method of claim 9, wherein the one or more properties of the electronic notification comprise one or more of: a type of the electronic notification, a source of the electronic notification, a time the electronic notification is received, or the notification content that is included in the electronic notification.

16. The method of claim 9, wherein determining whether to generate the notification content as the condensed version of the electronic notification, or to generate the notification content as the non-condensed version of the electronic notification, is further based on past user interactions, of the user, with one or more past electronic notifications that include a same source as the electronic notification.

17. A system comprising:
at least one processor; and
memory storing instructions that, when executed, cause the at least one processor to perform operations, the operations comprising:
identifying, at a vehicle computing device of a vehicle, an electronic notification designated for rendering to a user via the vehicle computing device;
generating, by the vehicle computing device, a current predicted level of driving engagement being exerted in navigating the vehicle;
selecting, based on both (i) one or more properties of the electronic notification and (ii) the current predicted level of driving engagement, a particular modality for rendering notification content that is based on the electronic notification, wherein selecting the particular modality is from amongst a plurality of candidate modalities, including:
an audible only modality,
a graphical only modality, and
an audible and graphical modality;
in response to determining that the current predicted level of driving engagement being exerted in navigating the vehicle is a first level of driving engagement:
selecting, based on both (i) one or more of the properties of the electronic notification and (ii) the first level of driving engagement, the audible only modality as the particular modality for rendering the notification content;

in response to determining that the current predicted level of driving engagement being exerted in navigating the vehicle is a second level of driving engagement:
   selecting, based on both (i) one or more of the properties of the electronic notification and (ii) the second level of driving engagement, the graphical only modality as the particular modality for rendering the notification content;

in response to determining that the current predicted level of driving engagement being exerted in navigating the vehicle is a third level of driving engagement:
   selecting, based on both (i) one or more of the properties of the electronic notification and (ii) the third level of driving engagement, the audible and graphical modality as the particular modality for rendering the notification content; and causing the vehicle computing to immediately render the notification content in the selected particular modality.

18. The system of claim 17, the operations further comprising:
generating the notification content as a function of the current predicted level of driving engagement,
   wherein generating the notification content as a function of the current predicted level of driving engagement comprises:
     determining, based on a magnitude of the current predicted level of driving engagement, to generate, as the notification content, a condensed version of the electronic notification, and
     wherein the electronic notification includes text, and wherein the notification content, for the condensed version of the electronic notification, includes less text than the electronic notification.

19. The system of claim 17, the operations further comprising:
determining, based on both (i) the one or more properties of the electronic notification and (ii) the current predicted level of driving engagement, to immediately render the notification content in lieu of delaying rendering of the notification content;
wherein causing the vehicle computing device to immediately render the notification content is in response to determining to immediately render the electronic content in lieu of delaying rendering of the notification content.

20. The system of claim 17, the operations further comprising:
in response to determining that the current predicted level of driving engagement being exerted in navigating the vehicle is a third level of driving engagement:
   selecting, based on both (i) one or more of the properties of the electronic notification and (ii) the third level of driving engagement, the audible and graphical modality as the particular modality for rendering the notification content.

* * * * *